(12) United States Patent
Koifman et al.

(10) Patent No.: US 10,341,919 B2
(45) Date of Patent: Jul. 2, 2019

(54) HANDOVER INITIATION METHODS AND SYSTEMS FOR IMPROVEMENT OF CELLULAR NETWORK PERFORMANCE

(75) Inventors: Gil Koifman, Petach-Tikva (IL); Adi Schwartz, Holon (IL); Yaakov Shoshan, Ashkelon (IL)

(73) Assignee: ELTA SYSTEMS LTD., Ashdod (IL)

( * ) Notice: Subject to any disclaimer, the term of this patent is extended or adjusted under 35 U.S.C. 154(b) by 250 days.

(21) Appl. No.: 13/989,663

(22) PCT Filed: Nov. 23, 2011

(86) PCT No.: PCT/IL2011/050026
§ 371 (c)(1),
(2), (4) Date: Aug. 29, 2013

(87) PCT Pub. No.: WO2012/070048
PCT Pub. Date: May 31, 2012

(65) Prior Publication Data
US 2013/0336289 A1    Dec. 19, 2013

Related U.S. Application Data

(60) Provisional application No. 61/417,044, filed on Nov. 24, 2010.

(51) Int. Cl.
*H04W 36/16* (2009.01)
*H04W 24/02* (2009.01)
(Continued)

(52) U.S. Cl.
CPC ......... *H04W 36/165* (2013.01); *H04W 24/02* (2013.01); *H04W 36/22* (2013.01);
(Continued)

(58) Field of Classification Search
None
See application file for complete search history.

(56) References Cited

U.S. PATENT DOCUMENTS

| 5,657,317 A | 8/1997 | Mahany et al. |
| 5,729,826 A | 3/1998 | Gavrilovich |

(Continued)

FOREIGN PATENT DOCUMENTS

| JP | 2003-219451 A | 7/2003 |
| KR | 20080087370 A | 10/2008 |

(Continued)

OTHER PUBLICATIONS

Hassan J. et al: "Cell hoping: A lightweight architecture for wireless communications", IEEE Personal Communications, IEEE Communications Sociaety, US, vol. 10, No. 5, Oct. 1, 2003, pp. 16-21, XP011102748, ISSN: 1070-9916, DOI: 10.11 09/MWC.2003. 1241090.

(Continued)

*Primary Examiner* — Saba Tsegaye
(74) *Attorney, Agent, or Firm* — Oliff PLC

(57) ABSTRACT

A mobile communication system including at least one individual mobile communicator in a population of mobile communicators served by a plurality of nodes, including at least one base station; wherein at least one individual mobile communicator is operative to at least once associating itself with a serving node from among the plurality of nodes using a serving node selection functionality operative for selecting the serving node so as to increase use of available bandwidth to and from at least one node which provides the individual communicator with an acceptable signal to noise ratio.

30 Claims, 24 Drawing Sheets

(51) Int. Cl.
*H04W 36/22* (2009.01)
*H04W 84/00* (2009.01)
*H04W 36/26* (2009.01)
*H04W 36/30* (2009.01)

(52) U.S. Cl.
CPC ............ *H04W 36/26* (2013.01); *H04W 36/30* (2013.01); *H04W 84/005* (2013.01)

(56) References Cited

U.S. PATENT DOCUMENTS

| | | | |
|---|---|---|---|
| 2002/0110105 A1* | 8/2002 | Awater | H04W 36/22 370/338 |
| 2004/0266393 A1* | 12/2004 | Zhao et al. | 455/407 |
| 2005/0176440 A1* | 8/2005 | Sang et al. | 455/453 |
| 2005/0226185 A1* | 10/2005 | Tell | H04W 36/18 370/331 |
| 2006/0240826 A1* | 10/2006 | Shinozaki | H04L 1/0009 455/436 |
| 2008/0125125 A1 | 5/2008 | Choi et al. | |
| 2008/0165776 A1 | 7/2008 | Tao et al. | |
| 2008/0227453 A1 | 9/2008 | Somasundaram et al. | |
| 2009/0003277 A1 | 1/2009 | Uppili | |
| 2009/0029645 A1 | 1/2009 | Leroudier | |
| 2009/0040982 A1* | 2/2009 | Ho | H04L 1/1874 370/331 |
| 2009/0041039 A1* | 2/2009 | Bear | H04L 45/38 370/401 |
| 2009/0285178 A1* | 11/2009 | Chin et al. | 370/331 |
| 2010/0173644 A1* | 7/2010 | Koyanagi | 455/453 |
| 2010/0177736 A1* | 7/2010 | Wang | H04L 1/1642 370/331 |
| 2010/0260103 A1* | 10/2010 | Guey et al. | 370/328 |
| 2011/0230187 A1 | 9/2011 | Jeon et al. | |
| 2012/0028665 A1* | 2/2012 | Kwon et al. | 455/501 |
| 2012/0082084 A1 | 4/2012 | Balakrishnan et al. | |
| 2012/0106346 A1* | 5/2012 | Aguirre et al. | 370/237 |
| 2012/0163179 A1 | 6/2012 | Jo et al. | |
| 2013/0059585 A1 | 3/2013 | Giloh | |
| 2013/0089022 A1 | 4/2013 | Lu et al. | |
| 2013/0128790 A1* | 5/2013 | Futaki et al. | 370/311 |
| 2013/0176988 A1* | 7/2013 | Wang | H04W 28/08 370/331 |

FOREIGN PATENT DOCUMENTS

| | | |
|---|---|---|
| WO | 2008/049238 A1 | 5/2008 |
| WO | 2011/092698 A1 | 8/2011 |
| WO | 2012/120510 A2 | 9/2012 |
| WO | 2012120519 A1 | 9/2012 |
| WO | 2013/118129 A1 | 8/2013 |
| WO | 2013/160892 A1 | 10/2013 |
| WO | 2014079486 A1 | 5/2014 |

OTHER PUBLICATIONS

Kaznmi M. et al: "Scheduling algorithms for soft handoff in cellular packet CDMA", Personal, Indoor and Mobile Radio Communications, 2000. PIMRC 2000. The 11th IEEE International Symposium on Sep. 18-21, 2000, pp. 671-675, XP010520719, ISBN: 978-0/7803-6463-9.

Djanatliev, M. (2009). LTE TDD Technology Overview. Rohd & Schwarz, pp. 1-13.

"Difference Between TDD and TDMA", available on the web at differencebetween.net/technology/communication-technology/difference-between-tdd-and-tdma/#ixzz2hgE3X9zM.—Dec. 2013, pp. 1-4.

GPP TS 36300 V9.7.0, pp. 1-174.

SIB4, IntraFreqNeighCellList in 3GPP TS 36.331, pp. 1-265.

3GPP LTE standards TS 23A01 figure 4.2.1-1, pp. 1-242.

Tools.ieff.org/html/rfc5614—Aug. 2009, pp. 1-72.

3GPP TR 36.836 V2.0.I (Oct. 2012); 3rd Generation Partnership Project; Technical Specification Group Radio Access Network; Mobile Relay for Evolved Universal Terrestrial Radio Access (E-UTRA) (LTE-Advanced); (Release 12). pp. 1-35, XP050650330 3GPP Standard Oct. 8, 2012.

Advanced Radio InTerface Technologies for 4G SysTems—ART1ST4G: relay configurations. Retrieved from the Internet: http://www.researchgate.net/profile/Mikael_Sternad/publication/266141250_EU_FP7_INFSO-ICT-247223_ARTIST4G_Project_Deliverable_D3.4_Relay_Configurations/links/5426cdae0cf2e4ce940a23f7.pdf> Aronsson, D et al. Jul. 29, 2011, Section 7.

* cited by examiner

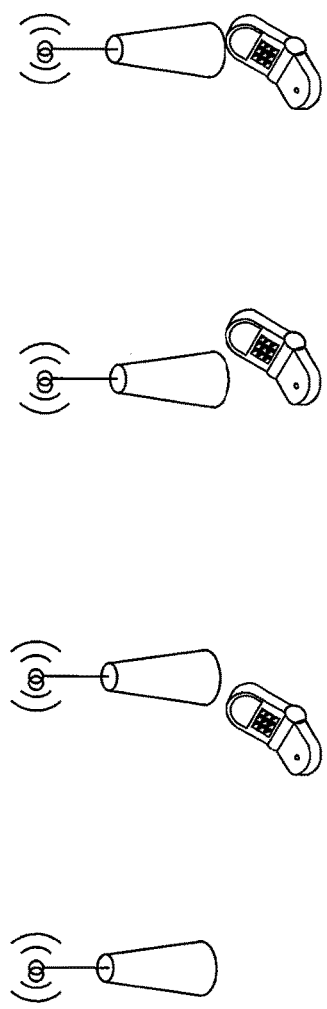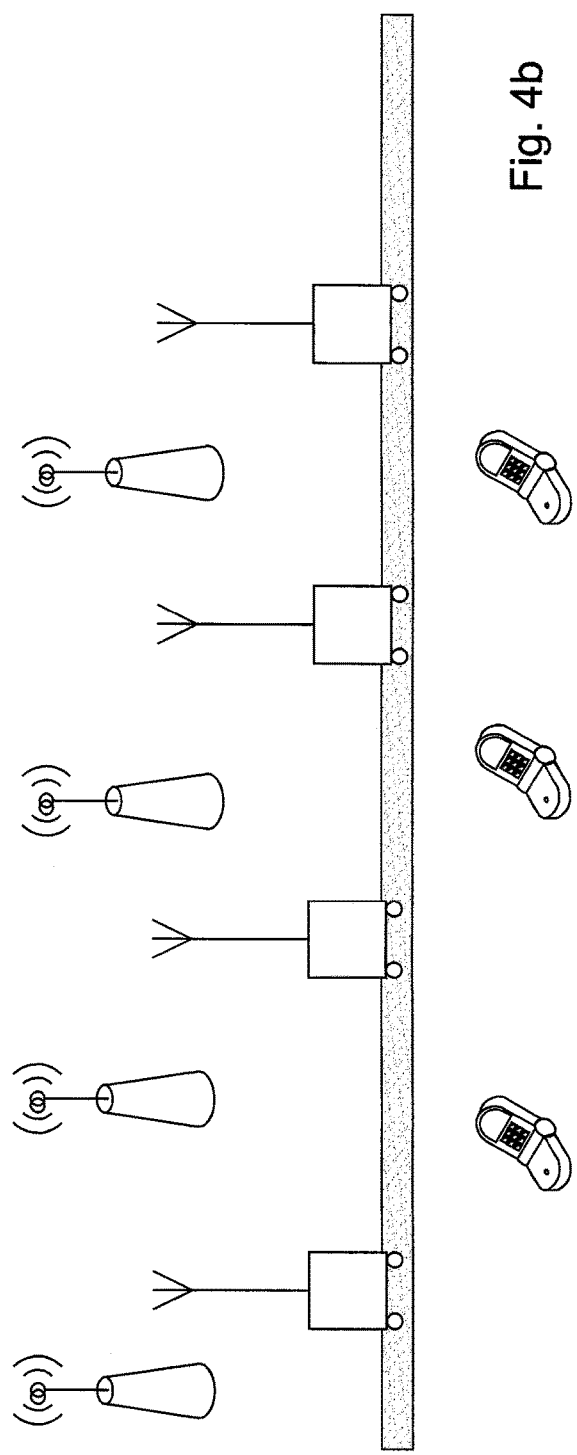

*Fig. 14*

| RA | Moving relay agent having radio backhauling functionality as a core interface and base-station interface as an SM interface. Such as but not limited to the moving base stations e.g. MrS units described in Published PCT Patent Application WO/2011/092698, entitled "Cellular Communication System With Moving Base Stations And Methods And Apparatus Useful In Conjunction Therewith" |
|---|---|
| BS | Stationary, typically conventional base-station, able to communicate e.g. conventionally with the core and with mobile communication device users |
| SM | Mobile communication device e.g. Standard mobile phone |
| Node | BS or RA or other node, typically not including endpoint nodes (phones), in a cellular communication network |
| Link | A potential connection between two nodes |
| Active link | A link that is currently being used to pass e.g. packets between two nodes |
| Link state | Quality grade e.g. indicating the potential information-to-noise ratio of a link |
| User | User of the mobile phones, which typically dynamically move across the service zone of the network |
| QOS | A parameter set of an application or user expressing a priority of that application or user relative to other applications or users served by the same cellular communication network. The QOS may |

| | |
|---|---|
| | for example indicate different delay, error rate and/or guaranteed bit rate requirements |
| Core | Responsible for overall control of the SM and establishment of services |
| Resource allocation chain | A cellular network resource allocation, also termed herein "service establishment" or "service requirements establishment", typically allocated by each of a chain of cellular communication network nodes connecting two end-point nodes in the network, that guarantees at least one requirement (such as but not limited to QoS, bandwidth, minimum delay, maximal error rate) of a communication session between the two end-point nodes. An example Resource allocation chain is a bearer as defined in conventional protocols such as GSM, UMTS and LTE. |
| PS | Packet switched |
| CS | Context switched |
| RS | Relay server, residing typically inside the core and responsible for overall control of the SM and RA in the hierarchical system |
| RH | Relay helper residing inside the RA and responsible for the control of the SM and RA that are actively linked to its RA or to descendent/s thereof |

*Fig. 15*

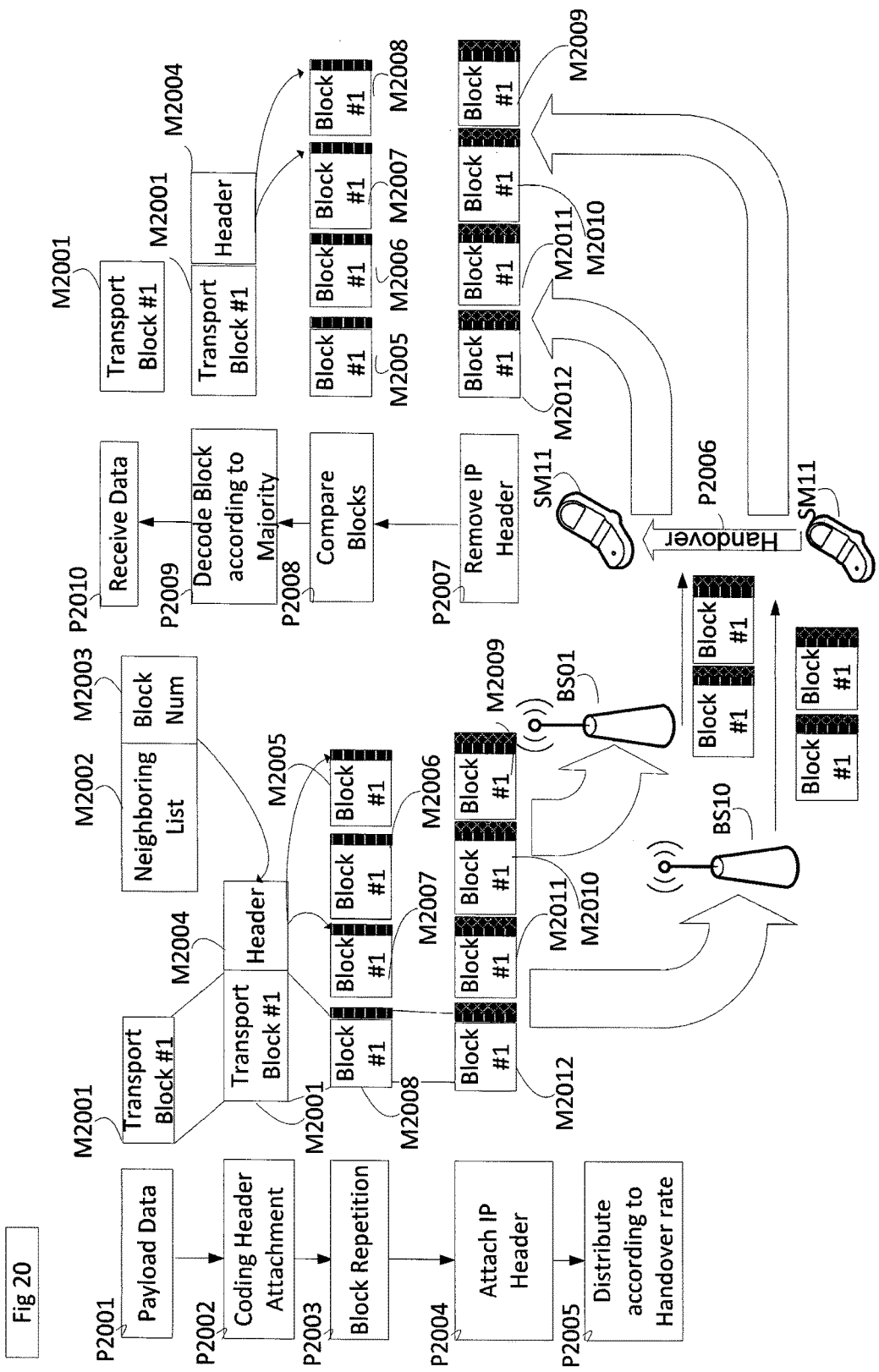

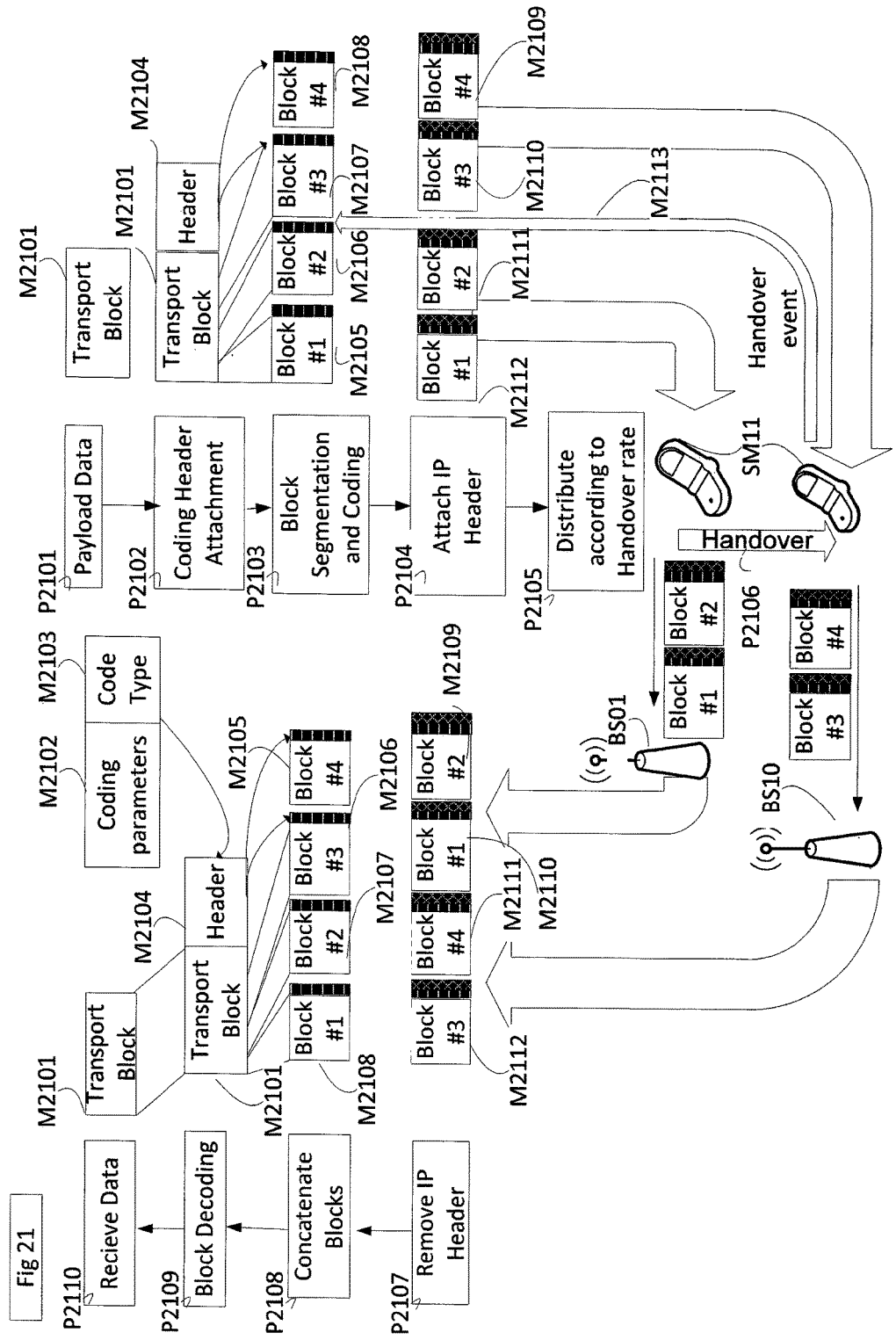

HANDOVER INITIATION METHODS AND SYSTEMS FOR IMPROVEMENT OF CELLULAR NETWORK PERFORMANCE

REFERENCE TO CO-PENDING APPLICATIONS

This application claims priority from U.S. provisional application No. 61/417,044, entitled "Two Handover Initiation Methods for Performance Improvement in Cellular Network and Systems Useful In Conjunction Therewith", filed Nov. 24, 2010.

FIELD OF THE INVENTION

The present invention relates generally to communication systems and more particularly to mobile communication systems.

BACKGROUND OF THE INVENTION

Many cellular communication networks are known, e.g. hierarchical mobile systems as described in U.S. Pat. No. 5,657,317 to Mahany et al and U.S. Pat. No. 5,729,826 to Gavrilovich.

LTE, 2G, 3G, WiFi and WiMax are known standards for mobile communication networks.

The disclosures of all publications and patent documents mentioned in the specification, and of the publications and patent documents cited therein directly or indirectly, are hereby incorporated by reference.

SUMMARY OF THE INVENTION

The embodiments shown and described herein are particularly useful in conjunction with vehicle fleets in which vehicles, such as busses, trains or taxis, are equipped with mobile base-stations which may function as relays, and/or mobile telephones or other cellular communication devices.

For example, in rural areas where sole reliance on fixed cellular base-station coverage limits the capacity of mobile stations at long ranges, mobile base stations that are installed on transportable mobile platforms e.g. busses, trains, taxis can enable high data-rate applications such as web-browsing, video-streaming, and can also be used as relays between other mobile base stations and fixed base stations. In addition, mobile base stations as described herein can be installed on-board airplanes to enable passengers to communicate with a fixed cellular infrastructure using their own cellular phones. Finally, if a mass attended event is expected or has occurred, it may be desired to send a fleet of mobile base-stations to the location of that event for the duration of the event. For example, event organizers, e.g. cultural or sports event organizers, may own or hire such a fleet which may be sent on one occasion to a first city in which a massively attended popular music concert or rally is being held, and on another occasion to a location in which Olympics or another mass-attended sports event is planned.

Certain embodiments of the present invention seek to provide systems and methods for enlarging overall network capacity by initiating handovers between possible serving relay/cells typically including initiating handovers using a suitable scheme such as a random scheme, a round-robin scheme, or a load dependent scheme.

Certain embodiments of the present invention seek to provide systems and methods for increasing network reliability e.g. employing a diversity technique, by initiating handovers between a possible serving relay/cell. Initiating handovers may be based on a suitable scheme such as a random scheme, a round-robin scheme, or a load dependent scheme.

The term "relay" is used herein to refer to a mobile node in a cellular communication network whose node has both base station and mobile communicator functionalities and is operative to serve mobile communicators, such as cellular telephones, or other relays, and to be served by base stations or other relays. Typically, each relay communicates via antennae with the mobile communicators, and includes a first radio manager having base station functionality which has a physical back-connection to the first radio manager, the first radio manager having a physical connection with the relay's mobile communicator functionality, which in turn communicates via antennae with at least one selectable (static) base station. Typically, the first radio manager comprises a radio resource manager and functionality for receiving information from, and sending information to, other radio managers, respectively co-located with other relays, and for using the information to determine whether to reject at least one mobile communicator seeking to be served by an individual base station associated with the individual co-located radio manager.

A particular problem characterizing mobile communication systems in which some mobile communicators communicate indirectly with the base stations, is thinness of the uplinks connecting the mobile communicators with the base stations. Certain embodiments of the present invention are helpful in overcoming this problem.

Mobile communication systems in which some mobile communicators are beyond-range of, hence communicate indirectly with, the base stations, typically include a core associated with base stations, mobile communicators which may or may not be within range of the base stations, and communication relaying mobile stations which have some or all of the functionalities of both base stations and mobile communicators. Mobile communication systems in which some mobile communicators communicate indirectly with the base stations are known in the art, e.g. any of the embodiments described in co-pending Published PCT Patent Application WO/2011/092698, entitled "Cellular Communication System With Moving Base Stations And Methods And Apparatus Useful In Conjunction Therewith".

When single-hop communication is used, a communication relaying mobile station is within the range of a base station and has a mobile communicator within its own range. When multi-hop communication is used, a chain of $n>=2$ communication relaying mobile stations are provided, the first of which, 1, is within the range of a base station, the last of which, n, has a mobile communicator within its own range, and each adjacent pair I, i+1 of which, for I=1, . . . n−1, is characterized in that the (i+1)'th communication relaying mobile station is within the range of the I'th communication relaying mobile station.

Conventionally, a mobile communicator "knows" which mobile communication network nodes, such as base stations, it can be heard by. However, conventionally, if a group of users is substantially co-located, the entire group tends to request service from a single base station, leading to undesirable situations in which the uplink of the single overloaded base station poorly serves the users associated therewith, whereas neighboring base stations which could relieve the congestion on the uplink of the single overloaded base station, have far less of a load.

Conventionally, mobile communicators look for base stations and ask to effect a handover, if the mobile communicator is in active mode, or a cell re-selection, otherwise.

This operation is conventionally based on reception quality of the mobile communicator by the base station and/or on the base station's report of whether or not it is able to add an additional mobile communicator to its current load. Both in handover and in cell re-selection, the desired effect is to transfer from one serving node e.g. base station to another.

According to certain embodiments, a random scheme is used to associate a mobile communicator with a serving node e.g. base station or relay, so as to enhance statistical distribution of mobile communicators between available serving nodes. Random association of a mobile communicator with a serving node can occur once per session or once per time slot, typically multiple times per communication session. Alternatively, a round-robin scheme may be used, such that periodically, say every 5 seconds, the mobile communicator transfers go to the next on line in a list of serving nodes which are proximal enough to receive from the mobile communicator. According to still a further alternative, a fair balancing scheme may be employed designed to ensure that the total throughput of descendants being served by the various relays is as balanced as possible over the available relays. For example, flitting between relays may occur in a weighted manner such that the mobile communicator spends more time with the relay that relays throughput faster. This functionality may be effected within the handset or within the relay.

In a typical cellular telephone system, e.g. as depicted in prior art FIG. 1, an area is divided into cells where each cell has a serving BS (base station). An SM (mobile communication device) moving in such a cellular network communicates by radio with the best BS (base station). The BSs communicate with the core network and with each other by either using a direct cable, or by using point-to-point microwave.

Several procedures are common to all cellular telephone systems:
  Handover is the procedure that runs when the SM (mobile communication device) moves between cells while it is in service.
  Cell selection is the procedure that selects the best BS (base station) to link to.

A mobile ad-hoc network (MANET), e.g. as depicted in FIG. 2, is a well studied concept in prior art. MANET is defined as an autonomous system of mobile routes, their associated hosts being connected by wireless links, the union of which forms an arbitrary graph. Such networks have been introduced with little degree of success, due to many technical and organizational challenges among delays, power consumption and scalability.

A hierarchical mobile system, e.g. as depicted in FIG. 3, has two radio-interface serving entities; BS (base station) and RA (relay agent or relay). The BSs are static base stations and the RAs are moving base stations comprising a radio interface for a backhauling interface, and a base-station as a front end to the user. Due to dynamics in the hierarchical mobile system, it is difficult to use a directional antenna; therefore there is a need to use an omni antenna. The user can connect to a BS (base station) or to a RA (relay) using the same standard interface and is transparent to the kind that it is connected to.

In FIG. 3, SMs are numbered 03, 06, 07, 11 and 12. The RAs are numbered 02, 05 and 09. The BSs are numbered 01, 08 and 10. The core is numbered 4. SM12 links to BS10, BS08 and RA09, its best link is to BS10 and therefore it has an active link to the BS10 and connects to the core through BS10. SM11 links to RA09 BS08 and BS10, its best link is to BS08 and therefore it has an active link to BS08. SM03 links to SB10, SB08 and RA09 its best link is to RA09 and therefore it has active link to RA09. SM06 links to RA09, RA05, RA02 and BS01 its best link is to RA09 and therefore it has active link to RA09. SM07 links to RA09, RA05, RA02 and BS01 its best link is to RA05 and therefore it has active link to RA05.

RA02 links to RA09, BS01 its best link is to BS01 and therefore it has active link to BS01. RA09 links to RA02, BS01 and BS08 its best link is to BS08 and therefore it has active link to BS08. RA05 links to RA02, BS01 and BS08 its best link is to BS02 and therefore it has active link to BS02.

There is thus provided, in accordance with at least one aspect of the present invention, a mobile communication system comprising at least one individual mobile communicator in a population of mobile communicators served by a plurality of nodes, including at least one base station; wherein the at least one individual mobile communicator is operative to at least once associating itself with a serving node from among the plurality of nodes using a processor-based serving node selection functionality operative for selecting the serving node so as to increase use of available bandwidth to and from at least one node which provides the individual communicator with an acceptable signal to noise ratio.

There is thus further provided, in accordance with at least one embodiment of the present invention a system wherein the individual mobile communicator is operative to at least pseudo-randomly select the serving node from a set of candidate serving nodes defined within the plurality of nodes.

There is thus provided, in accordance with at least one embodiment of the present invention a system wherein the individual mobile communicator is operative to select, at intervals, a serving node from a set of candidate serving nodes defined within the plurality of nodes, on a round-robin basis.

There is thus provided, in accordance with at least one embodiment of the present invention a system wherein the individual mobile communicator is operative to use a load-dependent scheme to select the serving node from a set of candidate serving nodes defined within the plurality of nodes.

There is thus further provided, in accordance with at least one embodiment of the present invention a system wherein the set of candidate serving nodes includes all nodes sufficiently close to the individual mobile communicator as to adequately receive transmissions therefrom.

There is thus still further provided, in accordance with at least one embodiment of the present invention a system including a first node from among the plurality of nodes which is serving the serving node and which is operative to transfer itself to a second node from among the plurality of nodes including selecting the second node so as to improve distribution of the population of mobile communicators over the plurality of nodes.

There is thus still further provided, in accordance with at least one embodiment of the present invention a system wherein the transfer comprises a handover process.

There is thus further provided, in accordance with at least one embodiment of the present invention a system wherein the transfer comprises a cell re-selection process.

There is thus still further provided, in accordance with at least one embodiment of the present invention a system wherein the plurality of nodes includes at least one relay.

There is thus still further provided, in accordance with at least one embodiment of the present invention a system wherein at least a portion of the serving node selection functionality is located in a base station serving the individual communicator.

There is thus still further provided, in accordance with at least one embodiment of the present invention a system wherein at least a portion of the serving node selection functionality is located centrally in a core serving the base station serving the individual communicator.

There is thus still further provided, in accordance with at least one embodiment of the present invention a system wherein at least a portion of the serving node selection functionality is located in a relay served by at least one base station and serving the individual communicator.

There is thus still further provided, in accordance with at least one embodiment of the present invention a system wherein the serving node selection functionality is located in its entirety in a base station serving the individual communicator.

There is thus still further provided, in accordance with at least one embodiment of the present invention a system wherein the serving node selection functionality is located in its entirety centrally in a core serving the base station serving the individual communicator.

There is thus still further provided, in accordance with at least one embodiment of the present invention a system wherein the serving node selection functionality is located in its entirety in a relay served by at least one base station and serving the individual communicator.

There is thus still further provided, in accordance with at least one aspect of the present invention a computerized mobile communication system serving a population of mobile communicators using a network comprising a plurality of mobile communication network nodes, including at least one base station serving the population of mobile communicators, the system comprising at least one individual mobile communicator from among the population of mobile communicators operative to enhance quality of information flowing over at least one of its downlink and uplink channels by at least once sending processor-identified mutually redundant information over a set of at least first and second serving nodes from among the plurality of nodes.

There is thus still further provided, in accordance with at least one embodiment of the present invention a system wherein data is sent to the first node and redundancy information derived from the data is sent to the second node.

There is thus still further provided, in accordance with at least one embodiment of the present invention, a system wherein identical data is sent to the first and second nodes.

There is thus still further provided, in accordance with at least one embodiment of the present invention a system wherein first data is sent to the first node and only a subset of the first data is sent to the second node.

There is thus still further provided, in accordance with at least one embodiment of the present invention a system wherein the first data comprises a sequence of packets sent to the first node and the subset comprises a subsequence within the sequence which is sent to the second node.

There is thus still further provided, in accordance with at least one embodiment of the present invention a system wherein the quality of information is enhanced in that probability of packet delay is reduced.

There is thus still further provided, in accordance with at least one embodiment of the present invention a system wherein the quality of information is enhanced in that probability of packet loss is reduced.

There is thus still further provided, in accordance with at least one embodiment of the present invention a system wherein the quality of information is enhanced in that accuracy of packets received is increased.

There is thus still further provided, in accordance with at least one embodiment of the present invention a system wherein the quality of information is enhanced in that probability that packets will be rejected is decreased.

There is thus still further provided, in accordance with at least one embodiment of the present invention a system including the population of mobile communicators.

There is thus still further provided, in accordance with at least one embodiment of the present invention a system including the plurality of nodes.

There is thus still further provided, in accordance with at least one embodiment of the present invention a system wherein the individual mobile communicator is operative to periodically select the serving node from the set of candidate serving nodes.

There is thus still further provided, in accordance with at least one embodiment of the present invention a system wherein the set of candidate serving nodes includes the plurality of nodes.

There is thus still further provided, in accordance with at least one embodiment of the present invention a system wherein the set of candidate serving nodes includes all nodes in the network sufficiently close, geographically, to the individual mobile communicator as to adequately receive transmissions therefrom.

There is thus still further provided, in accordance with at least one embodiment of the present invention a system wherein the set of candidate serving nodes includes all nodes in the network sufficiently close, topologically, to the individual mobile communicator as to adequately receive transmissions therefrom.

There is thus still further provided, in accordance with at least one embodiment of the present invention a system wherein the serving node selection functionality is operative to identify a set of more than one node which each provides the individual communicator with an acceptable signal to noise ratio, at least one of which cannot provide the individual communicator's bandwidth requirement, and wherein the available bandwidths between the nodes and the individual communicator together at least equal the individual communicator's bandwidth requirement; and to select the nodes in the set for the individual communicator such that the individual communicator associates itself sequentially with each of the nodes in the set thereby to satisfy its bandwidth requirement.

There is thus still further provided, in accordance with at least one embodiment of the present invention a system wherein at least a portion of control functionality employed to enhance quality of information by controlling the mutually redundant information is located in a base station serving the individual communicator.

There is thus still further provided, in accordance with at least one embodiment of the present invention a system wherein at least a portion of control functionality employed to enhance quality of information by controlling the mutually redundant information is located centrally in a core serving the base station serving the individual communicator.

There is thus still further provided, in accordance with at least one embodiment of the present invention a system wherein at least a portion of control functionality employed to enhance quality of information by controlling the mutually redundant information is located in a relay served by at least one base station and serving the individual communicator.

There is thus still further provided, in accordance with at least one embodiment of the present invention a system wherein the portion of control functionality employed to enhance quality of information by controlling the mutually redundant information is located in its entirety in a base station serving the individual communicator.

There is thus still further provided, in accordance with at least one embodiment of the present invention a system wherein the portion of control functionality employed to enhance quality of information by controlling the mutually redundant information is located in its entirety centrally in a core serving the base station serving the individual communicator.

There is thus still further provided, in accordance with at least one embodiment of the present invention a system wherein the portion of control functionality employed to enhance quality of information by controlling the mutually redundant information is located in its entirety in a relay served by at least one base station and serving the individual communicator.

There is thus still further provided, in accordance with at least one embodiment of the present invention a system wherein the individual mobile communicator is operative to at least pseudo-randomly select at least one serving node from a set of candidate serving nodes defined within the plurality of nodes.

There is thus still further provided, in accordance with at least one embodiment of the present invention a system wherein the individual mobile communicator is operative to select, at intervals, at least one serving node from a set of candidate serving nodes defined within the plurality of nodes, on a round-robin basis.

There is thus still further provided, in accordance with at least one embodiment of the present invention a system wherein the individual mobile communicator is operative to use a load-dependent scheme to select at least one serving node from a set of candidate serving nodes defined within the plurality of nodes.

There is thus still further provided, in accordance with at least one embodiment of the present invention a system wherein the mobile communicator comprises a telephone.

There is thus still further provided, in accordance with at least one embodiment of the present invention a system wherein the mobile communicator comprises a cellular telephone.

There is thus still further provided, in accordance with at least one embodiment of the present invention a system wherein the network operates using an LTE standard.

There is thus still further provided, in accordance with at least one embodiment of the present invention a system wherein the network operates using a WIMAX standard.

There is thus still further provided, in accordance with at least one aspect of the present invention a method for manufacturing any of the systems shown and described herein.

There is thus still further provided, in accordance with at least one aspect of the present invention a method for operating or using any of the systems shown and described herein.

There is thus still further provided, in accordance with at least one aspect of the present invention a computer program product, comprising a computer usable medium having a computer readable program code embodied therein, the computer readable program code adapted to be executed to implement any of the methods shown and described herein.

Conventionally, a serving base station was selected as the base station which provides the smallest signal to noise ratio to the seeking mobile communicator. Conventionally also, base stations hand-over communication devices to other base stations, if the band-width demands on them are in excess of what they are able to provide. Optionally, the serving node selection functionality is located partly in one, and partly in another, of the following: core, base station and relay, or entirely in any one of them.

Optionally, fair balancing is provided such that the total throughput of descendants being served by the various relays is as balanced as possible over the relays, e.g. by fluctuating back and forth between relays such that more time is spent being served by relays that relay throughput faster.

Certain embodiments of the present invention seek to provide a system and method of performing initiated, synchronized and typically time dependent, scheduled or periodic handovers of mobile station at a cellular network. This technique is also termed herein "cell spreading" or "cell hopping". The initiator of the spreading/hopping may for example be a server located at the core of the cellular network or software located at a base station. The initiation process may be seamless to the mobile station in that the mobile station does not know the initiated process is activated. Optionally, the mobile station may know of and even take part in the initiation process.

A particular advantage of use of the "cell spreading" or "cell hopping" techniques is the ability to better use exploit radio resources of a cellular network, either in its entirely or a single cell therein. Radio resources that can be better used include but are not limited to time, frequency, power.

A particular advantage of use of the "cell spreading" or "cell hopping" techniques is the ability to enhance the performance of mobile station transmission and reception in a cellular network. Performance characteristics that may thus be enhanced include but are not limited to capacity, diversity, redundency, latency, power consumption, power spectral density.

A particular advantage of use of the "cell spreading" or "cell hopping" techniques is the ability to better exploit the backhauling resources of a cellular network. backhauling resources whose exploitation may thus be enhanced include but are not limited to, for LTE networks, S1 interfaces capacity and X2 interface capacity. A particular advantage of use of the "cell spreading" or "cell hopping" techniques is the ability to exploit in parallel e.g. in a combined manner, more than one base station backhauling link resource e.g. by using cell hopping that is enabled using high priority standard handover commands.

Backhauling information may optionally be employed in making the decision to do cell hopping. and in for the cell hopping process itself.

Also provided, in accordance with at least one aspect of the present invention, is a handover method comprising performing at least one initiated, synchronized, scheduled, time slotted handover of at least one mobile station in a cellular network.

Further in accordance with at least one aspect of the present invention, the initiated, synchronized, scheduled handover is initiated by a server located in a core of the cellular network.

Still further in accordance with at least one aspect of the present invention, the initiated, synchronized, scheduled time slotted handover is initiated by a server located in a core of the cellular network.

Additionally in accordance with at least one aspect of the present invention, the handover is initiated by a server located in a core of the cellular network.

Further in accordance with at least one aspect of the present invention, the initiated handover is scheduled.

Additionally in accordance with at least one aspect of the present invention, the initiated and scheduled handover is time slotted.

Further in accordance with at least one aspect of the present invention, the initiated and scheduled handover is data size determined.

Further in accordance with at least one aspect of the present invention, the initiated and scheduled handover is synchronized.

Further in accordance with at least one aspect of the present invention, the cellular network is LTE cellular network.

Still further in accordance with at least one aspect of the present invention, the cellular network is a hierarchical cellular network.

Additionally in accordance with at least one aspect of the present invention, the initiated, synchronized, scheduled, time slotted handover is initiated by software located at a base station in the cellular network.

Additionally in accordance with at least one aspect of the present invention, the initiated and scheduled handover is data size determined.

Also provided is a computer program product, comprising a computer usable medium or computer readable storage medium, typically tangible, having a computer readable program code embodied therein, the computer readable program code adapted to be executed to implement any or all of the methods shown and described herein. It is appreciated that any or all of the computational steps shown and described herein may be computer-implemented. The operations in accordance with the teachings herein may be performed by a computer specially constructed for the desired purposes or by a general purpose computer specially configured for the desired purpose by a computer program stored in a computer readable storage medium.

Any suitable processor, display and input means may be used to process, display e.g. on a computer screen or other computer output device, store, and accept information such as information used by or generated by any of the methods and apparatus shown and described herein; the above processor, display and input means including computer programs, in accordance with some or all of the embodiments of the present invention. Any or all functionalities of the invention shown and described herein may be performed by a conventional personal computer processor, workstation or other programmable device or computer or electronic computing device, either general-purpose or specifically constructed, used for processing; a computer display screen and/or printer and/or speaker for displaying; machine-readable memory such as optical disks, CDROMs, magnetic-optical discs or other discs; RAMs, ROMs, EPROMs, EEPROMs, magnetic or optical or other cards, for storing, and keyboard or mouse for accepting. The term "process" as used above is intended to include any type of computation or manipulation or transformation of data represented as physical, e.g. electronic, phenomena which may occur or reside e.g. within registers and/or memories of a computer. The term processor includes a single processing unit or a plurality of distributed or remote such units.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

Elements separately listed herein need not be distinct components and alternatively may be the same structure.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor may be employed to compute or generate information as described herein e.g. by providing one or more modules in the processor to perform functionalities described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

BRIEF DESCRIPTION OF THE DRAWINGS

Prior art

Prior art

Prior art

Prior art FIGS. 4A-4B are simplified block diagram illustrations of a 2-tier hierarchical system as described in U.S. Pat. No. 5,729,826.

Prior art

Prior art

FIGS. 14-15, taken together, form a table of terms useful in understanding certain embodiments of the present invention.

FIG. 20 is an example of transport channel processing of DL spread over base stations using a repetition code method operative in accordance with certain embodiments of the present invention.

FIG. 21 is an example of transport channel processing of UL spread over base stations using a code correction method operative in accordance with certain embodiments of the present invention.

DETAILED DESCRIPTION OF CERTAIN EMBODIMENTS

The terms used in the present specification such as but not limited to those listed below, may be construed either in accordance with any definition thereof appearing in the prior art literature or in accordance with the specification or drawings, or as follows:

active link: If nodes are actually transferring data between them, the link between them is termed an "active link". In some technologies e.g. 4G, a link is sometimes established as an active link in advance i.e. before it is actually needed to transfer data.

base station: The term "base station", which may be mobile or stationary, is intended to include, for example, a cellular base station such as but not limited to a 2G, 3G, 4G, or mobile Wimax cellular base station, as well as a wireless access point such as but not limited to a WiFi, Bluetooth or WiMax access point.

cellular: The term "cellular" is intended to include WiFi and other technologies which have a single cell i.e. access point. It is appreciated that access points may be interconnected outside the scope of the cellular network, e.g. via IDSL.

connected: Two network nodes are "connected" if they are capable of transferring data between them, e.g. over a wired or wireless link.

core: a switching functionality which activates connections between, ultimately, mobile communication devices. It is appreciated that the core may be co-located with a base station e.g. if the base station is an access point.

downlink: link from core toward mobile communication device i.e. a link in a sequence or route (also termed downlink sequence or down-route) of one or more links connecting the core to the device.

establish a link: activate a link i.e. cause a link to become active hierarchical network: a communication network wherein at least one mobile communication device is served by a first base station, also termed herein a "relay", which communicates with the core via a sequence of L>=1 linked base stations including: (a) optionally, L-1 base stations connected to one another hence also termed herein "relays", and (b) a second base station which is connected to the core.

radio interface: apparatus using radio technology to provide a link.

relay: see definition of "hierarchical network"

relay apparatus: synonymous to "relay"

served by: connected via an active link to uplink: link from a mobile communication device toward the core i.e. a link in a sequence or route (also termed uplink sequence or up-route) of one or more links connecting the device to the core.

Figure 1:
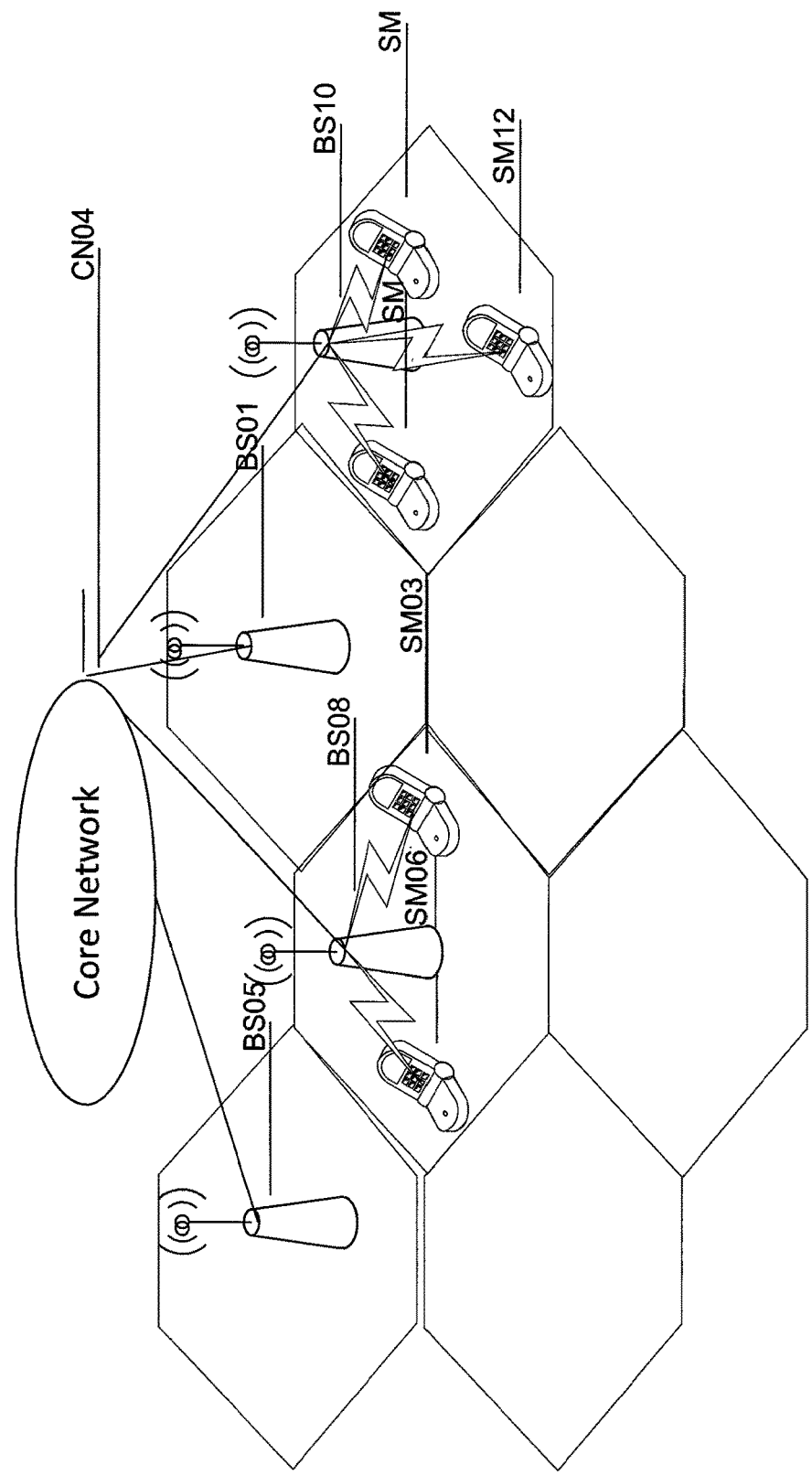
FIG. 1 is a semi-pictorial diagram of a conventional cellular system.
Figure 2:
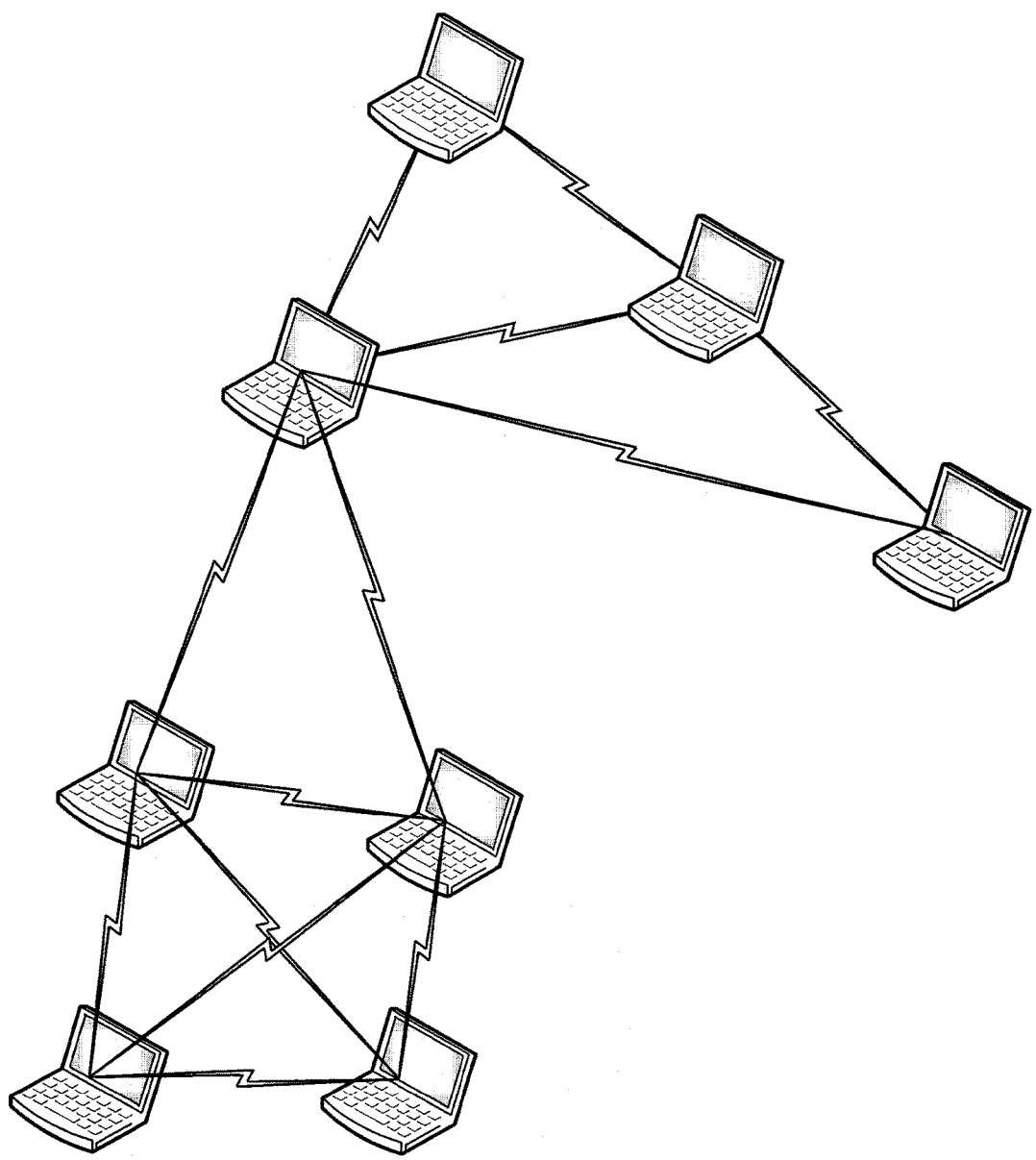
FIG. 2 is a semi-pictorial diagram of a mobile ad-hoc network system.
Figure 3:
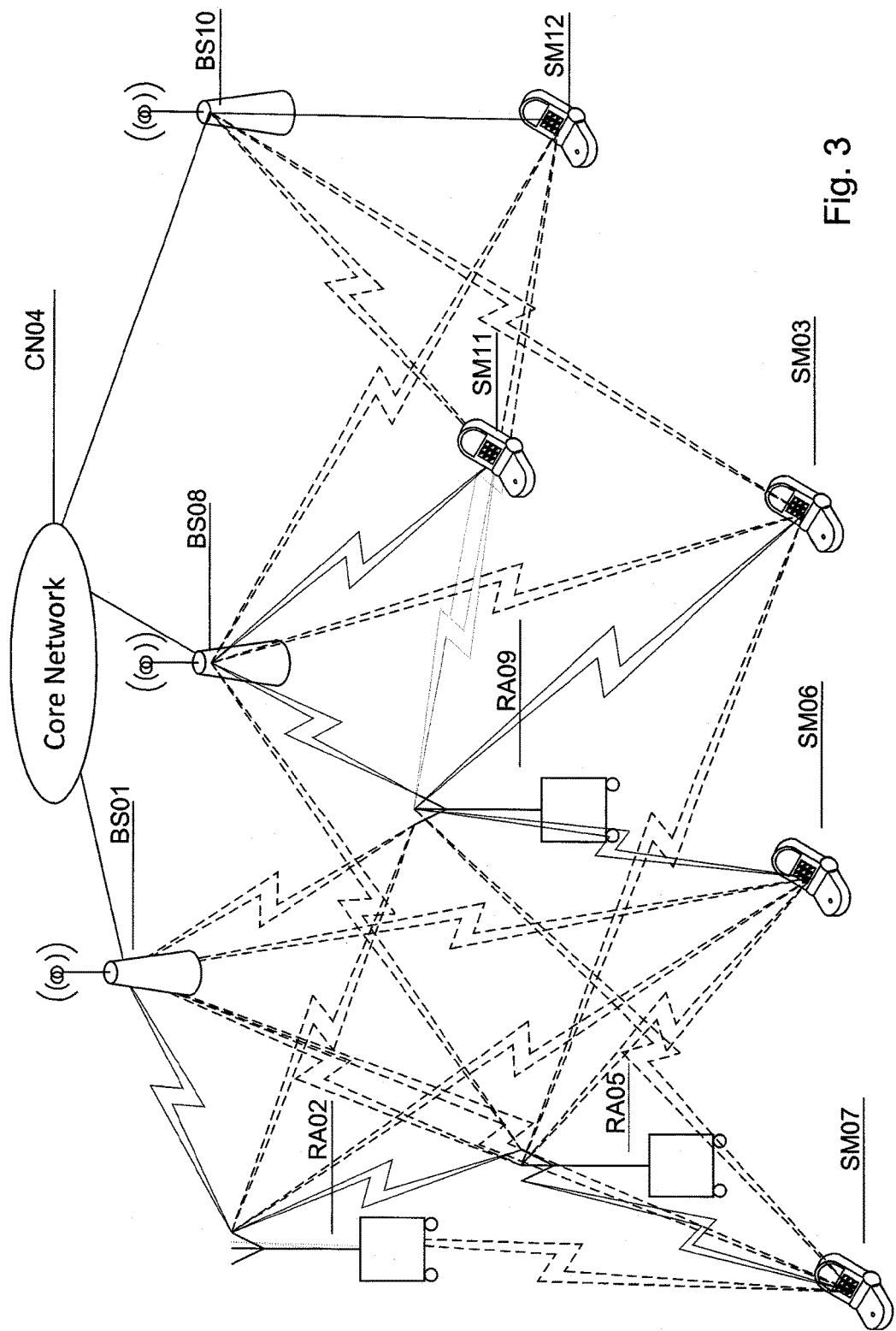
FIG. 3 is a semi-pictorial diagram of an n-level hierarchical cellular system of the invention.
Figure 5:
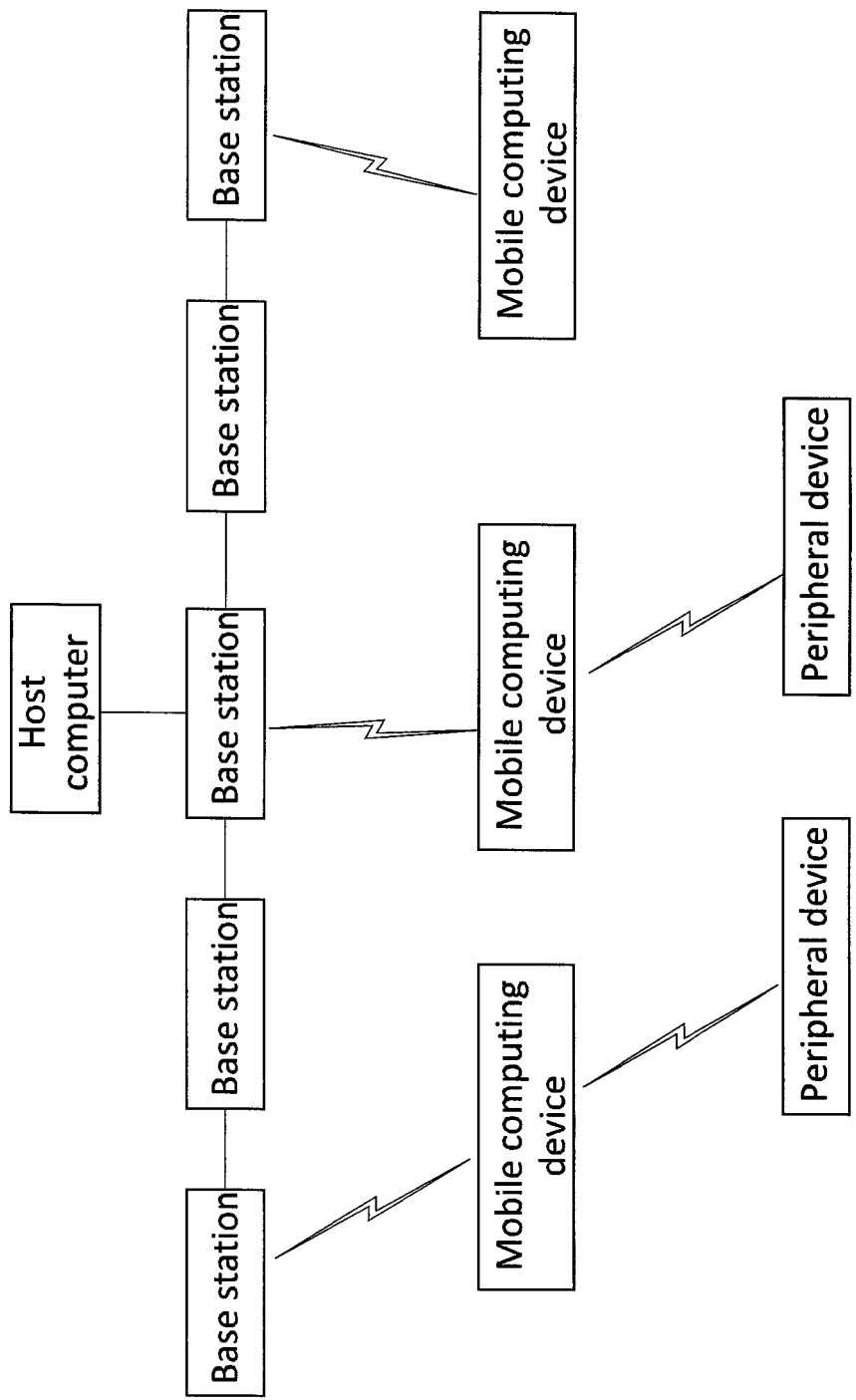
FIG. 5 is a simplified block diagram illustration of a 2-tier hierarchical LAN as described in U.S. Pat. No. 5,657,317

The term "mobile computing device", e.g. in FIG. 5, is used herein to include any mobile communication device being a node in a communication network such as a cellular communication network, such as but not limited to a mobile telephone e.g. cellphone, smartphone, etc., as well as any computer that has a wireless modem such as a laptop with a LTE modem. It is appreciated that while many mobile communication devices have computing ability, the embodiments shown and described herein are applicable also to mobile communication devices which lack computing ability.

Figure 7:
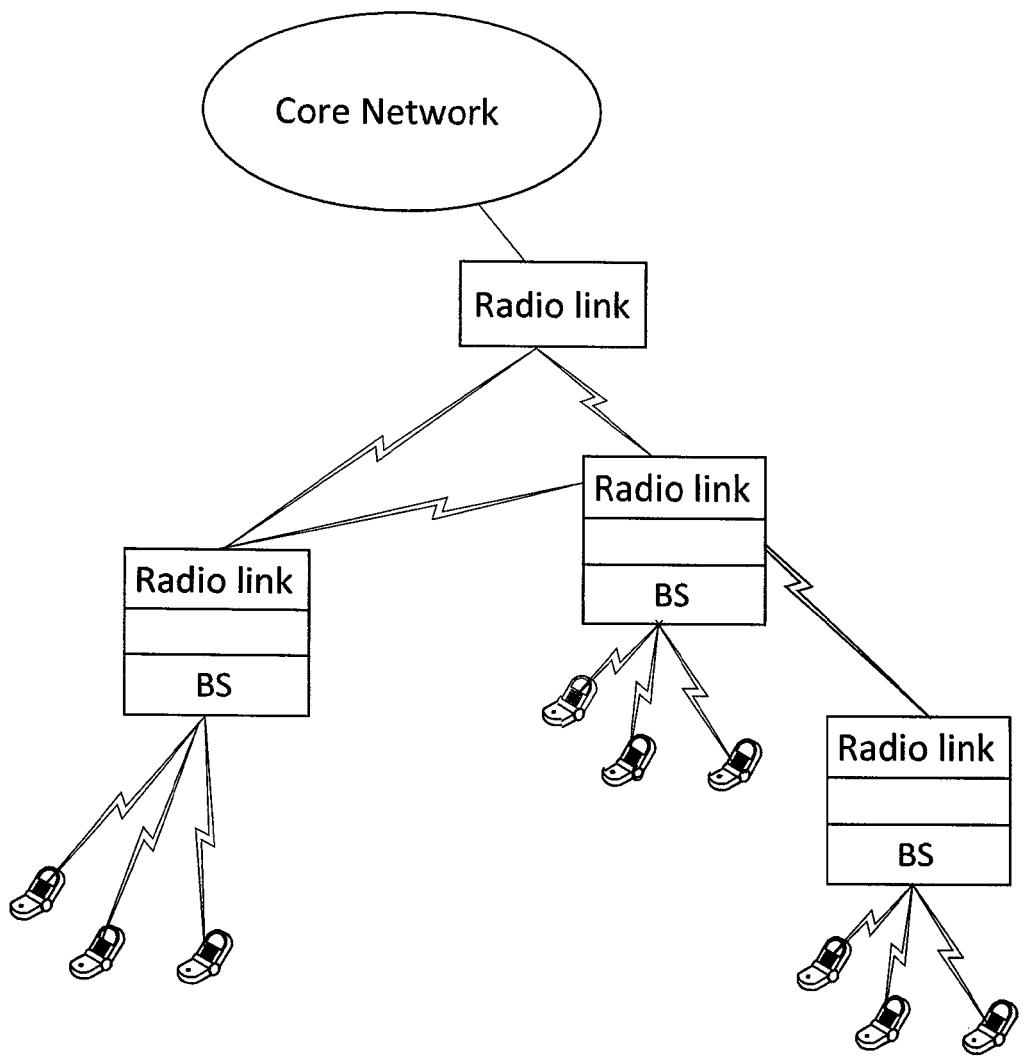
FIG. 7 is a semi-pictorial diagram of an N-tier hierarchical radio-link cellular system network constructed and operative in accordance with certain embodiments of the present invention, where N may be more than 2.

Hierarchical mobile systems are known, such as for example those shown and described in U.S. Pat. Nos. 5,729,826 and 5,657,317 and in co-pending Published PCT Patent Application WO/2011/092698, entitled "Cellular Communication System With Moving Base Stations And Methods And Apparatus Useful In Conjunction Therewith". A particularly suitable hierarchical radio-link network, for implementing certain embodiments of the invention shown and described herein, is illustrated in FIG. 7 of the above published PCT Patent Application WO/2011/092698.

U.S. Pat. No. 5,729,826, for example, describes a 2-tier (also termed herein 2-level) hierarchical cellular network, where the RAs move with traffic and communicate with the core via fixed radio ports. The RAs are provided with a high gain directional antenna. An example of a suitable network of this type is illustrated in prior art FIGS. 4A-4B. A moving base station may have an RH added to the processor block.

U.S. Pat. No. 5,657,317, for example, describes a 2-tier hierarchical LAN. The first tier may comprise a hard wired LAN comprising radio base stations. The second tier may include a variety of roaming computer devices such as vehicle terminals and computer terminals to peripheral devices that can bind to the mobile computing device and communicate with different devices on the LAN. An example of a suitable network of this type is illustrated in prior art FIGS. 4A-4B.

Figure 6A:
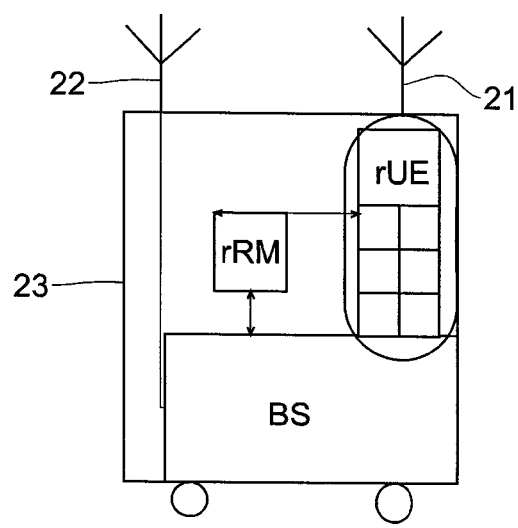
FIGS. 6A-6B is a semi-pictorial diagram of an n-tier hierarchical in-band multi-hop cellular network, using SM (mobile communication device) as a backhauling device.
Figure 6B:
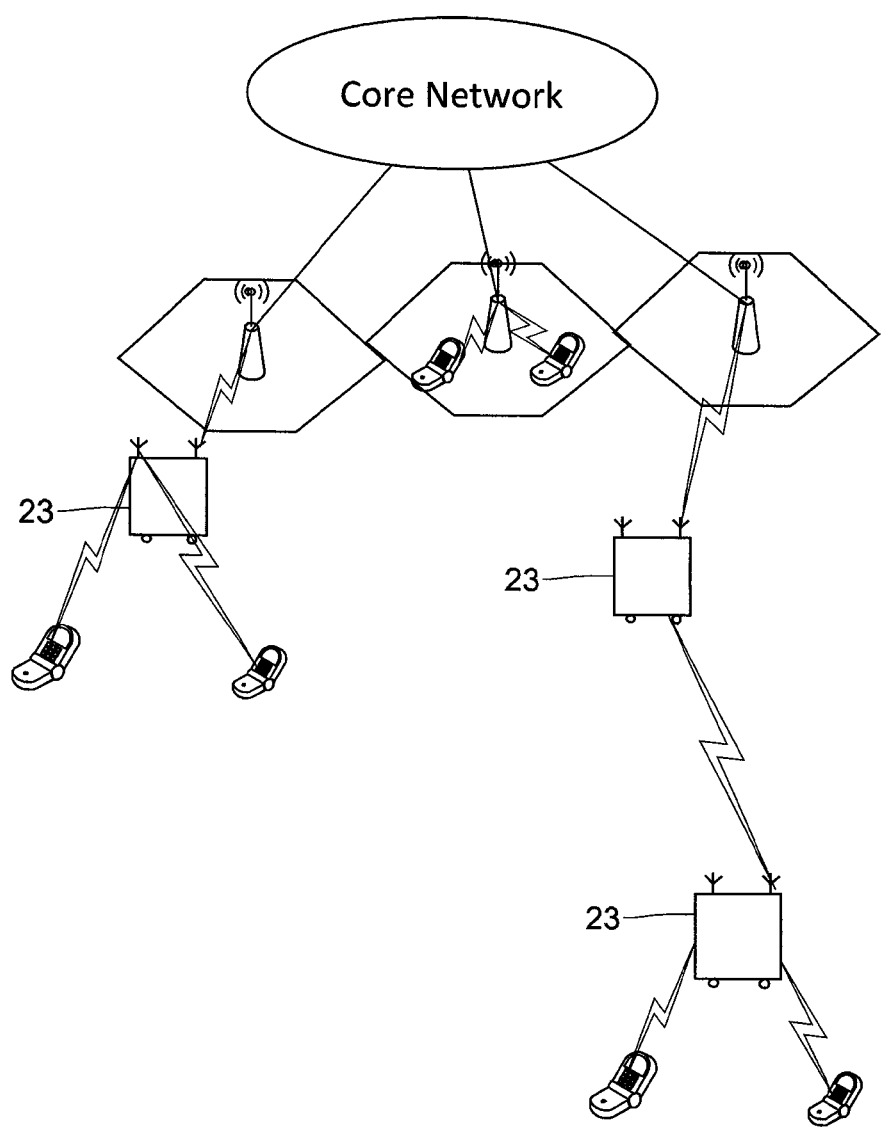

The above-mentioned co-pending Israel Patent Application No. 206455 illustrates an n-tier hierarchical in-band multi-hop cellular network using SM (mobile communication device) as a backhauling device as illustrated in FIGS. 6a-6b. The RH may be added to the rRM block.

An N-tier hierarchical radio-link network, as depicted in FIG. 7, uses radio interface for backhauling, giving higher uplink bandwidth capacity and better range cover.

A dynamic hierarchical cellular system, e.g. as in FIG. 7, typically has some or all of the following capabilities which are typically not applicable in a conventional cellular system:

a. Finding the route to SM (mobile communication device) through several hops. Due to the dynamics of the system, when a message is being routed from source to destination, there is uncertainty in the position of the destination when the message arrives; moreover, there is uncertainty in the correctness of the routing route because several nodes along the route may change their position.

b. Traffic 'bottlenecks' occur at a certain point along the backhauling route. A typical cellular system does not consider bottlenecks along the backhauling route. In a hierarchical cellular system, because of limitations in the backhauling bandwidth, bottlenecks might occur. For example, consider that several distant users are using an RA (relay) that is connected to another RA (relay) that might be almost overloaded due to other distant users. The result of these bottlenecks is low utilization of the radio channels and an unsatisfying user experience.

c. Using a dynamic hierarchical cellular system adds two variables to the routing graph, number of hops and link quality. These two variables change rapidly, due to the dynamics of the system, and affect the utilization of the system. Hops increase delay, and link quality affects the backhauling bandwidth.

d. Service management through several hops. Different services have different requirements; for example, services such as voice calls are not tolerated to latency, but require little bandwidth; services like web browsing are tolerated to latency but are high bandwidth consumers. In order to be able to support these kinds of services, different service requirements and their mutual effect on each other are taken into account. In some cases, interfaces might interfere with each other, for example when they share the same limited resource, such as uplink bandwidth on a specific route. In such cases, the more important service request is typically given advantage.

e. Scheduling of the different services. Different services have different characteristics. Some use a constant bit, rate and are not tolerated to delays, such as voice calls, and others are tolerated to delays, but are very 'greedy' in their bandwidth consumption, and work in bursts. Once the services have been established, a special scheduler, which resides in the RA (relay), may schedule their requests according to their service requirements. Moreover, different priorities may be assigned to different service requests. In such cases, the more important request should have advantage in the resource scheduler.

f. Handover management in case of a backhauling link failure, specifically:

Certain embodiments of the present invention seek to provide a way to optimize the bottleneck problem through analysis of the topology graph, and to balance it through handover.

Certain embodiments of the present invention seek to provide a way to give bandwidth allocation according to the service precedent.

Certain embodiments of the present invention seek to provide a way to give bandwidth allocation according to the user precedent.

Certain embodiments of the present invention seek to provide a way to give bandwidth allocation according to the destination precedent.

Certain embodiments of the present invention seek to provide a way to find the route to the SM (mobile communication device) using a central application server that resides in the core.

Certain embodiments of the present invention seek to provide a way to find the route to the SM (mobile communication device) using an autonomic distributed application that resides in the RA (relay).

Certain embodiments of the present invention seek to provide a way to increase uplink bandwidth capacity by using handover.

Certain embodiments of the present invention seek to provide a way to increase bandwidth capacity by using a number of backhauling radio links.

Certain embodiments of the present invention seek to provide a way to increase bandwidth expectancy by using requests to enlarge\reduce bandwidth that considers different service requirements along the route.

Certain embodiments of the present invention seek to provide a way to increase bandwidth expectancy by using requests to enlarge\reduce bandwidth that considers different users' precedents along the route.

Certain embodiments of the present invention seek to provide a way to increase bandwidth expectancy by segmenting the available bandwidth while considering different service requirements along the route.

Certain embodiments of the present invention seek to provide a way to increase network reliability by using handover.

Schemes for enlarging overall network capacity by initializing handovers between possible serving cells are now described with reference to FIGS. 8-13. Traditionally, most of the backhaul lines, connecting the wireless interfaces with the core network, use TDM (E1,T1) lines, each providing up to 2 MBps capacity, inadequate capacity for high data rates.

Figure 8:
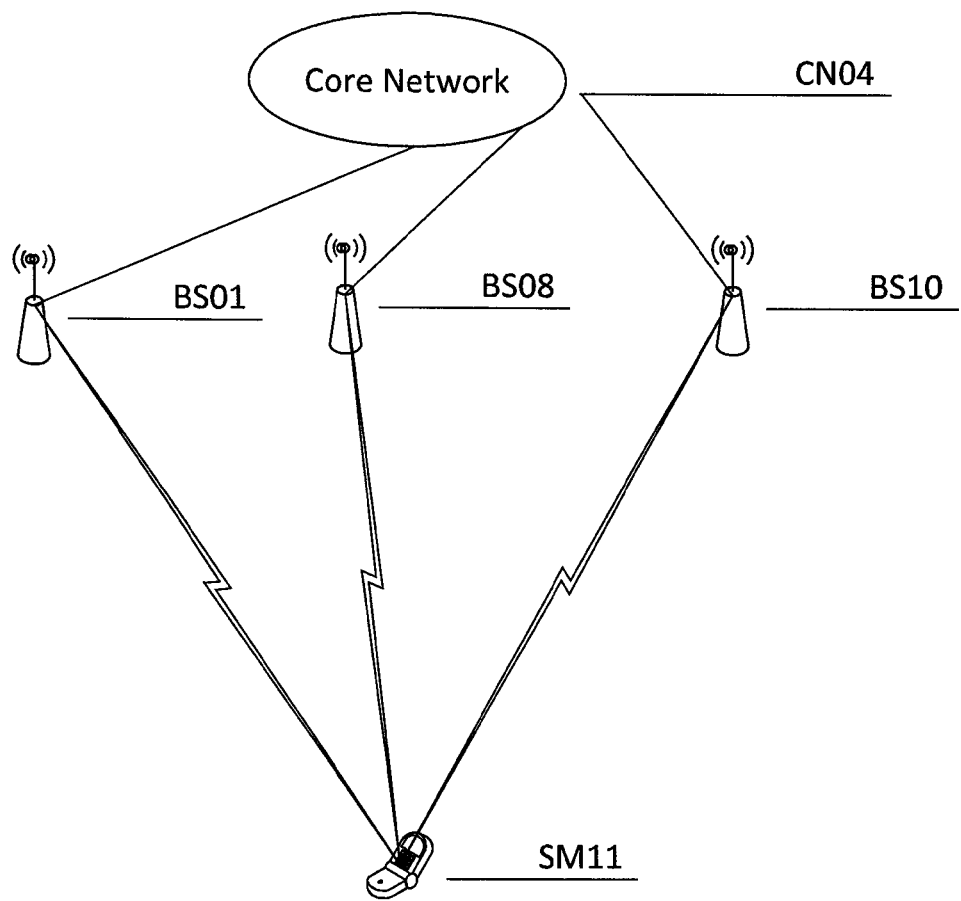
FIG. 8 is a simplified semi-pictorial diagram of enlarging overall network capacity by initializing handover, according to certain embodiments of the present invention.
Figure 9:
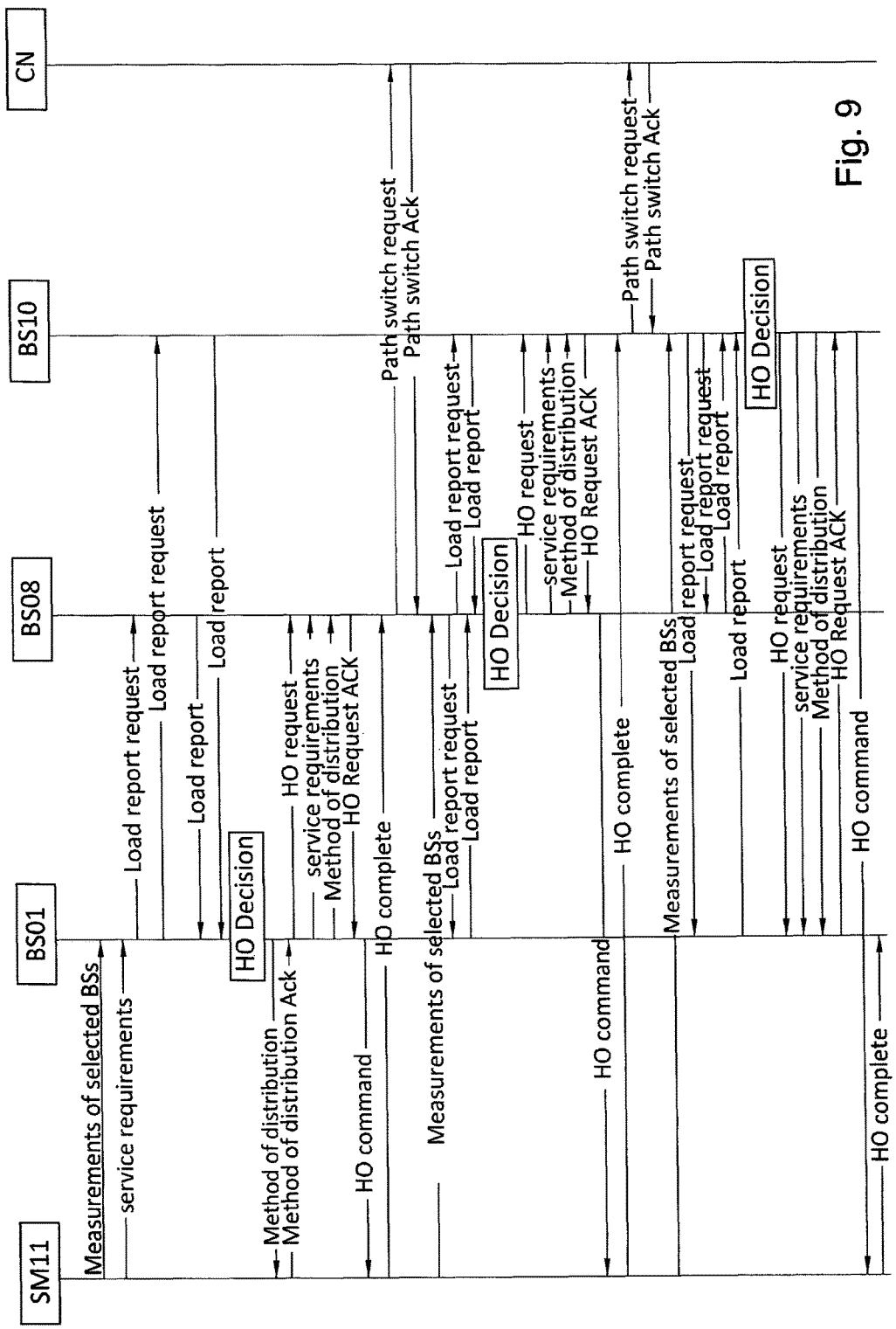
FIG. 9 is a sequence diagram for the apparatus of FIG. 8, according to certain embodiments.

FIG. 8 is a simplified semi-pictorial diagram of enlarging overall network capacity by initializing handover, according to certain embodiments of the present invention. FIG. 9 is a sequence diagram for the apparatus of FIG. 8, according to certain embodiments. In the illustrated embodiment, BS10, BS01 and BS08 reside at approximately the same distance from SM11. Moreover BS10, BS01 and BS08 are approximately equally loaded. Traditionally SM11 selects one of the best, using signal to noise ratio as a criterion of bestness, available BSs and connect to it, for example BS08. Due to backhauling inadequate problem addition of another user may result in an overloaded backhauling line and low utilization of the radio channels. For example, SM11 connects to BS08, SM11 requires 600 kbs and BS08 have only 200 kbs available. This may increase the service delay and service queues of all users that are connected to this BS (base station).

Handover can be used as a round robin mechanism to enlarge the overall network capacity, as depicted in FIGS. 8 and 9. For example, SM11 employs 600 kbs and BS08, BS01, BS10 have only 200 kbs available in their backhaul line. SM11 sends a burst of 200 kb every ⅓ of a second to BS08, BS01, BS10 in a round-robin mechanism and succeeds in gaining the required 600 kbs. Typically, coordination is provided between the BSs and the SM (mobile communication device) in order to achieve this enlargement as depicted in FIG. 9.

In some protocols such as LTE, BSs are able to connect to one another. SM11 sends measurements of selected BSs in order to introduce the available BSs for the round-robin mechanism and its bandwidth requirements. BS01 runs the HO (handover) decision method including the service (min BW and max BW, delay, etc.) requirements and the available resources provided by the other BSs. The HANDOVER decision method returns the method of distribution namely, in the illustrated example, sending the data in bursts of 200 kbps.

The first burst is dispatched to BS01 and put in a backhauling queue. HANDOVER request, service requirements, and method of distribution messages are sent to the next BSs. These control messages are small compared to the data hence typically do not add much of an overload. When the next BS (base station) acknowledges the handover request, a handover command is sent to the next BS (base station) and results in an handover complete message sent to the next BS (base station) by the SM (mobile communication device). The BS (base station) informs the core network of a path switch, and again the BS (base station), BS10 in the illustrated example, receives current measurements of selected BSs, runs the handover decision method and decides to continue with the current method of distribution.

At the same time BS10 receives the next 200 kb burst. From BS08 the SM (mobile communication device) hands over to BS10, sending it the next burst message and from there back to BS01. This round robin mechanism may continue till the session terminates or until there is a change in the topology of the network.

Topology changes in the network that may require a change in the round robin mechanism may for example include: a change in the selected BSs and/or changes in the available backhaul bandwidth of the selected BS (base station). A change in the bandwidth availability of the selected BS (base station) may result in selecting different serving BSs or, in the worst case, a smaller bottleneck in the backhauling queue. The handover mechanism may order a change in the distribution mechanism. For example, SM11 may no longer see BS01. This may be indicated by absenting BS01 from the measurements list which will result in an update in the method of distribution for sending bursts of 300 kb.

Any suitable method may be used for load balancing such as but not limited to the following and any suitable combination thereof:

a. Constant periodic time slot sharing e.g. as shown in FIGS. 8 and 9 b. Random distribution over time and destination.

c. Proportional sharing according to the load and link quality, meaning (a) spending more time on the less loaded BSs, where "less loaded" may for example be in terms of bandwidth and/or in terms of number of users served by that BS (base station) and/or (b) spending more time on the inverse ratio of the link quality.

FIG. 9 depicts a round robin mechanism to enlarge overall network capacity using handovers in a cellular network system such as LTE. LTE enables fast handover due to provision of an option for effecting fast handover between two BSs including only notifying the core of a path switch change. The decision to effect a handover is triggered by the BS (base station) with a special handover method that enables it to handover in a round robin mechanism.

Methods of distribution may include but are not limited to the following or any suitable combination thereto:

1. Splitting the data into contiguous equal bursts

2. Splitting the data into contiguous proportional-share bursts according to load and link quality 3. Interleaving data and splitting it into bursts according to a suitable one of the above methods 1 and 2.

Handover mechanisms are provided and supported by the major cellular protocols such as GSM, UMTS and LTE. Support messages may be added in the application layer in order to split data according to the distribution method; for example splitting the data into interleaving bursts.

LTE provides a feature whereby optimization of radio is effected by selective retransmission. This feature enables messages to be sent in bursts without waiting for acknowledgement. The next BS (base station) may be informed by the SM (mobile communication device) of the already received packets on the downlink side. Similarly, on the uplink side, the next BS (base station) may be informed by the previous BS (base station) of packets not to be retransmitted and may then inform the SM (mobile communication device) of the transmission acknowledgement.

Figure 10:
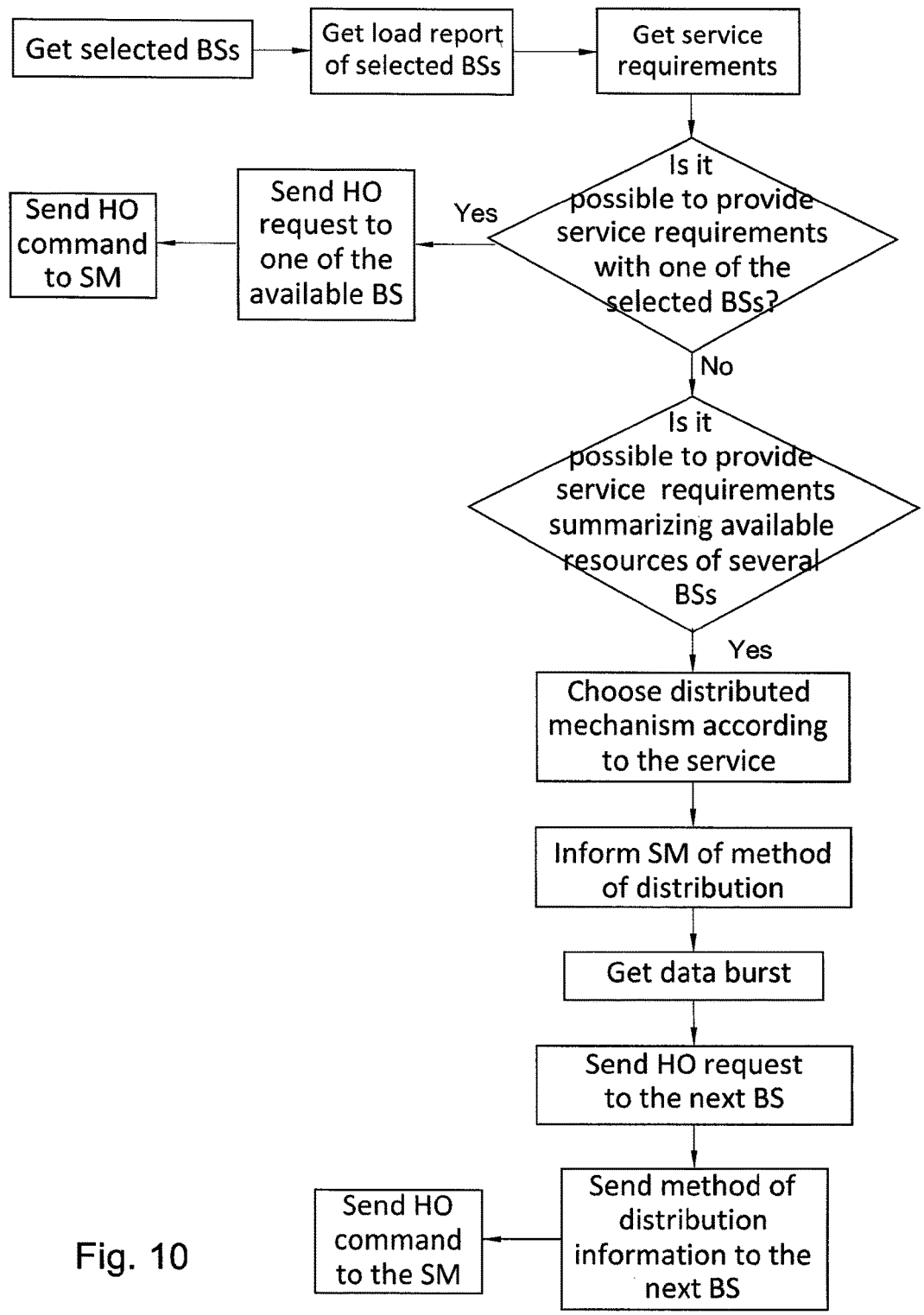
FIG. 10 is a simplified flowchart illustration of a method useful in conjunction with the apparatus of FIGS. 8-9.

FIG. 10 is a simplified flowchart illustration of a method useful in conjunction with the apparatus of FIGS. 8-9. Specifically, FIG. 10 is a simplified flowchart illustration of a method useful in enlarging overall network capacity by initializing handovers between possible serving cells, in accordance with certain embodiments of the invention. As shown, the BS (base station) may retrieve SM (mobile communication device)'s selected BSs. The BS (base station) typically employs the load report of the selected BSs from the BSs and retrieves service requirements from the SM (mobile communication device).

Typically, there are several kinds of application-specific requirements, such as but not limited to any or all of:

Guaranteed UL bit rate

Guaranteed DL bit rate

Maximal UL bit rate

Maximal DL bit rate

Figure 12A:
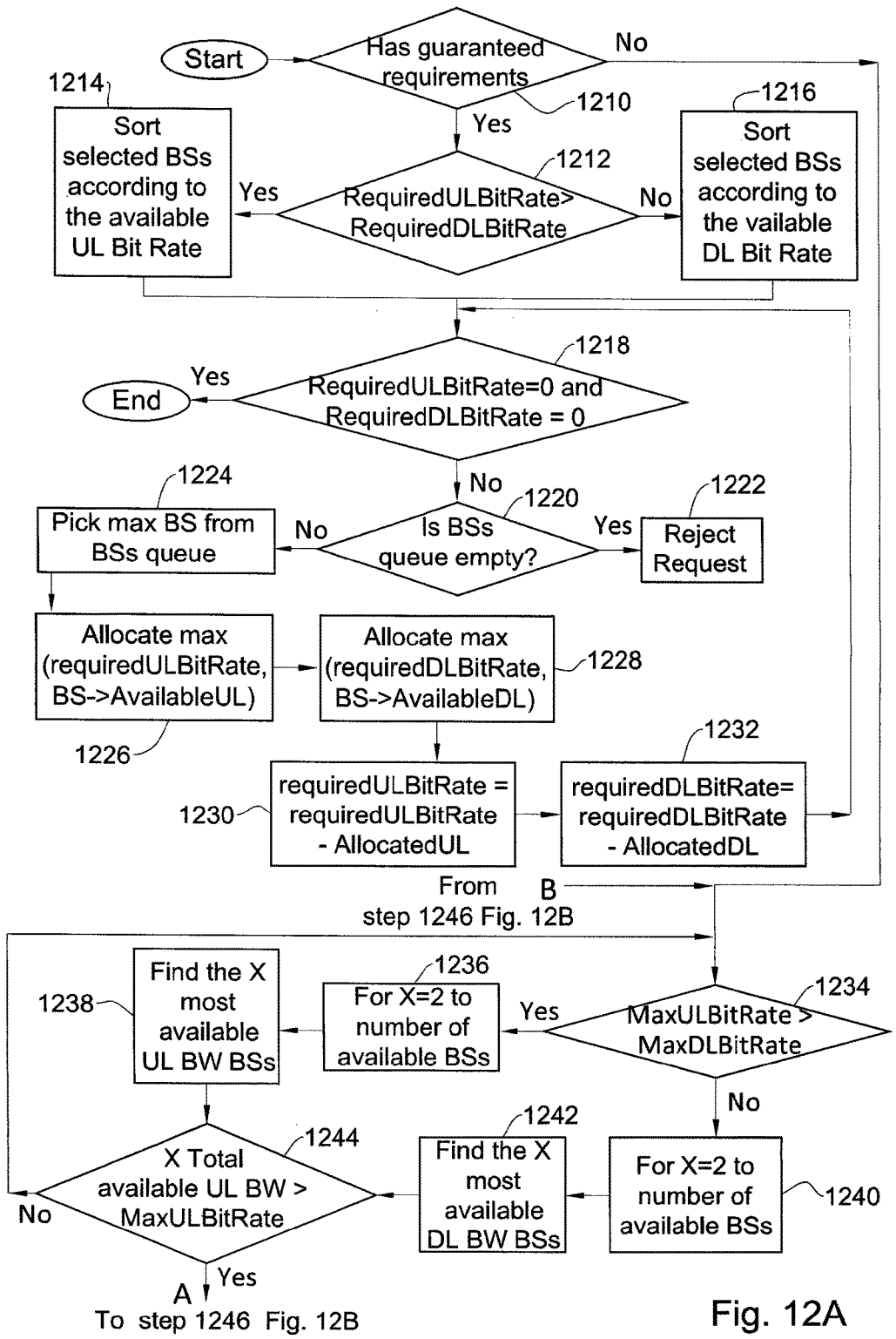
FIG. 12 is a simplified flowchart illustration of an example method for effecting a distributed mechanism according to certain embodiments of the present invention.
Figure 12B:
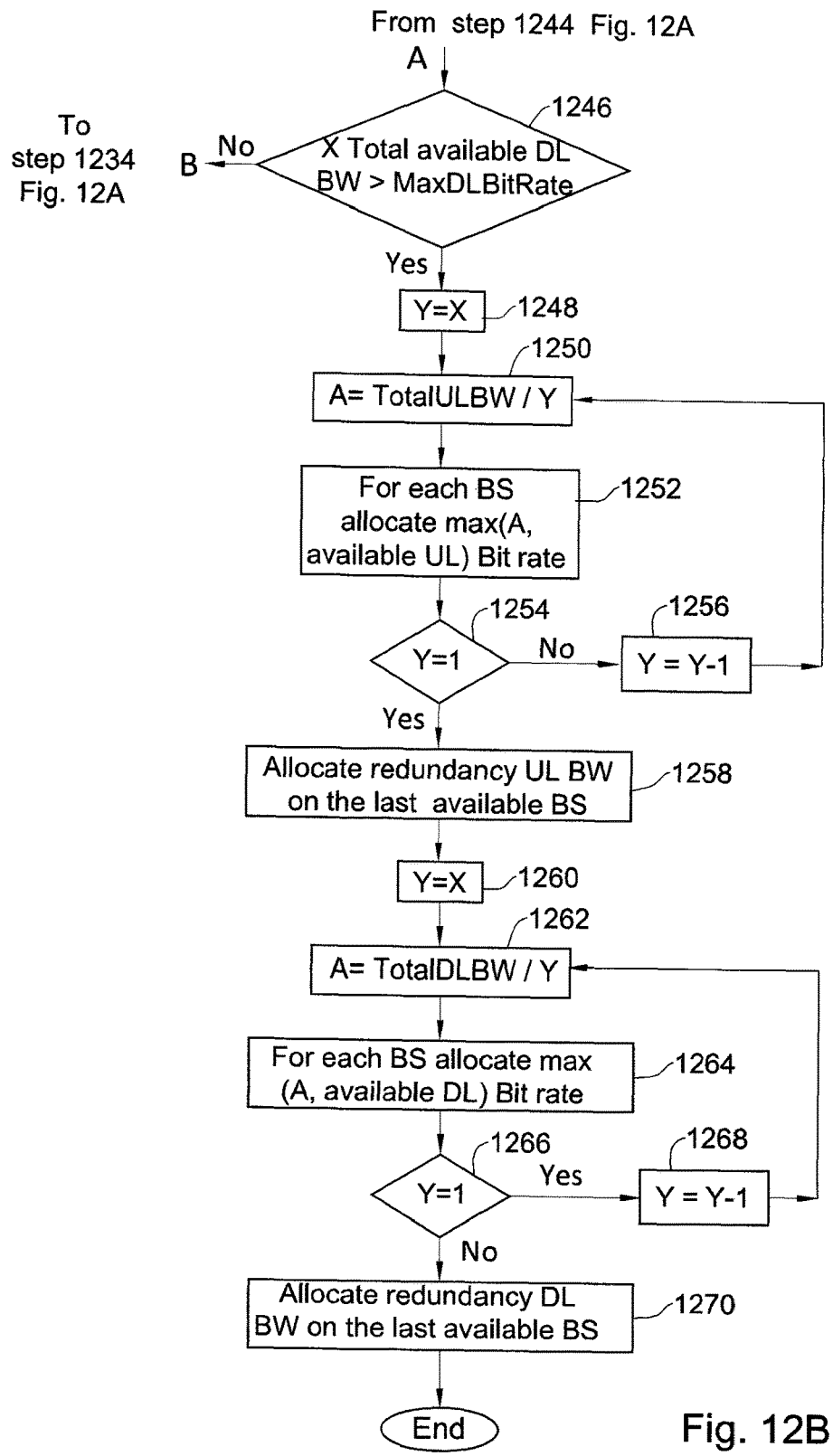

The enlarging method allocates the UL\DL bit rate if possible and otherwise may reject the request. In case of a maximal UL\DL bit rate requirement, it allocates UL\DL bit rate up to the maximal requirement or up to the available one. If current BS (base station) or any of the other selected BSs are able to provide all the required bandwidth then the SM (mobile communication device) is handed over to that BS (base station). Otherwise the BS (base station) summarizes the available bandwidth of several BSs. If they are able to provide the minimal requirements then BS (base station) executes the chosen distributed mechanism as depicted in FIG. 12. BS (base station) sends to the SM (mobile communication device) a definition of at least one characteristic of the method of distribution. When the first data burst arrives, BS (base station) starts the handover mechanism; it sends a request for handover to the next selected BS (base station) including the method of distribution and the service requirements. The method of distribution's characteristics may include some or all of the size of each burst, the order of the BSs and all the load reports that lead to the method of distribution decision. In case of a change in one of the variables' distributed mechanism, e.g. as shown in FIG. 12, a command may be issued to change the method of distribution according to the new inputs. It is appreciated that FIG. 12 includes various decision points and that in practice, any subset of the decision points may be provided, rather than all of the decision points shown, and the distribution method may then be changed mutatis mutandis to take into account the particular subset employed.

FIG. 12 is a simplified flowchart illustration of a method for effecting a distributed mechanism according to certain embodiments. The method and all methods shown herein may include some or all of the illustrated steps, suitably ordered e.g. as shown. The method as shown typically handles guaranteed bit rate requirements differently than maximal bit rate requirements. If the requirement is a guaranteed bit rate requirement, the method tries to allocate the selected BSs using a greedy approach sorting the BSs according to the available resources. If the requirement is a maximal bit rate, it allocates the selected BSs evenly trying keeping the number of handover minimal; if there aren't enough resources, it allocates whatever maximum resources it is capable of.

The SM (mobile communication device) receives a channel where the bit rate indicates the bit rate of the summary of the selected BSs available bandwidth, when a BS (base station) receives information equals to its allocated burst size it sends an handover request to the next BS (base station) and handover command to the SM (mobile communication device).

Figure 13:
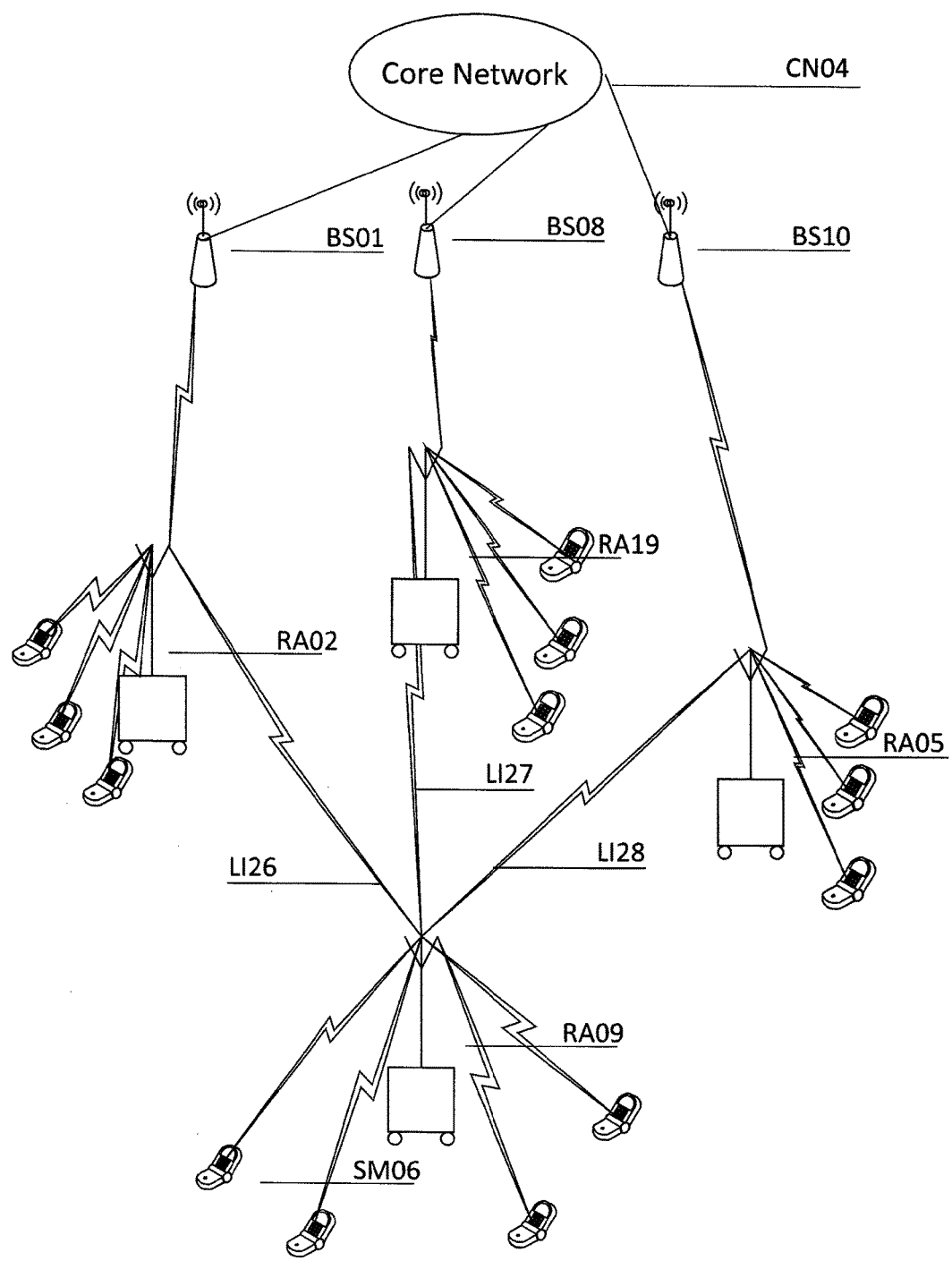
FIG. 13 is a semi-pictorial diagram of using handover in order to enlarge overall network capacity, all constructed and operative in accordance with certain embodiments of the present invention.

Enlarging overall network capacity by initializing handovers is depicted in FIG. 13 which depicts a hierarchical network in which relays are operative in relaying information both between one another and from base stations to mobile communication devices. It is appreciated that the embodiment described herein with reference to FIG. 13 is also useful, mutatis mutandis, in non-hierarchical networks and in conjunction with non-hierarchical components in a hierarchical network.

In the illustrated embodiment, RA02, RA19 and RA05 reside at approximately the same distance from RA09. Moreover, RA02, RA19 and RA05 are approximately equally loaded; three SMs are attached to each one of them. Traditionally RA09 will pick one of the available RAs and be actively linked to it; in this case the one which RA09 picks, will be loaded and eventually some of its services will be dropped. In the illustrated embodiment, the following messages may pass over the following links:
LI26:
1. link through RA02 for T time
4. link through RA02 for T time
LI27:
2. link through RA19 for T time
LI28:
3. link through RA05 for T time The handover can be used as a round robin mechanism to enlarge the overall network capacity, as depicted in FIG. 13. RA09 is linked to RA02 for T time and then RA19 for T time and then to RA05 for T time. The load is thus socially balanced between RA (relay), and each RA (relay) is loaded only for a small fraction of time, enabling it to be in almost full service.

Several methods for load balancing are introduced:
1. Constant periodic time slot sharing as shown in FIG. 13.
2. Randomly distributed over time and destination.
3. Proportional sharing according to the load and link quality, meaning spending more time on the less loaded (bandwidth, number of users), RA (relay) or spending more time on the inverse ratio of the link quality.
4. Combining the above or any other option.

One optional process that enables slotted handover comprises:
1. A scheduler process that enables sending and receiving in a time slot. Scheduling in this content includes determining the order of the handovers, typically by generating a list including a sequence of base-stations).
2. Alternatively, the scheduler may enable sending and receiving in a particular data size, e.g. by indicating, for each handover, a specific size of information (bits) sent or received.
3. optionally, a combined scheduler including the functionalities 1 and 2 above.
4. clock synchronization methods to coordinate the time slots between different servers or base-stations.
5. routing process that knows where to route to in each time slot, or alternatively knows to wait in queue for the time slot, or alternatively to duplicate the messages to all optional routes
6. distributed radio resource manager, to build radio resource plan according to different requirements Another method to enable time slot handover, is to initialize handover by the client, RA09, on each time slot. This method excels in ease of implementation and may be most suitable when time slot time is greater than handover time. This method is less suitable for applications in which adding to the overhead of the handover messages and handover time are significant impediments. On the other hand, the first process is superior in its complexity and coordination, and provides a clock synchronizer.

Schemes for enlarging overall network reliability by initializing handovers between possible serving cells are now described. The schemes for enlarging network capacity described herein with reference to FIGS. 8-13 may be employed mutatis mutandis in order to enlarge the network's reliability. Data is duplicated and sent several times in each time slot to increase network reliability. In case of loss of a connection in one of the routes, the other backed up messages can be used instead.

Duplicated data may comprise the duplicated data header. A duplicated data header may, comprise the message identification, copy number and the number of copies. When one of the copies reaches the destination address, the destination unit may ignore all other instances of the message, without indicating an error.

Figure 11:
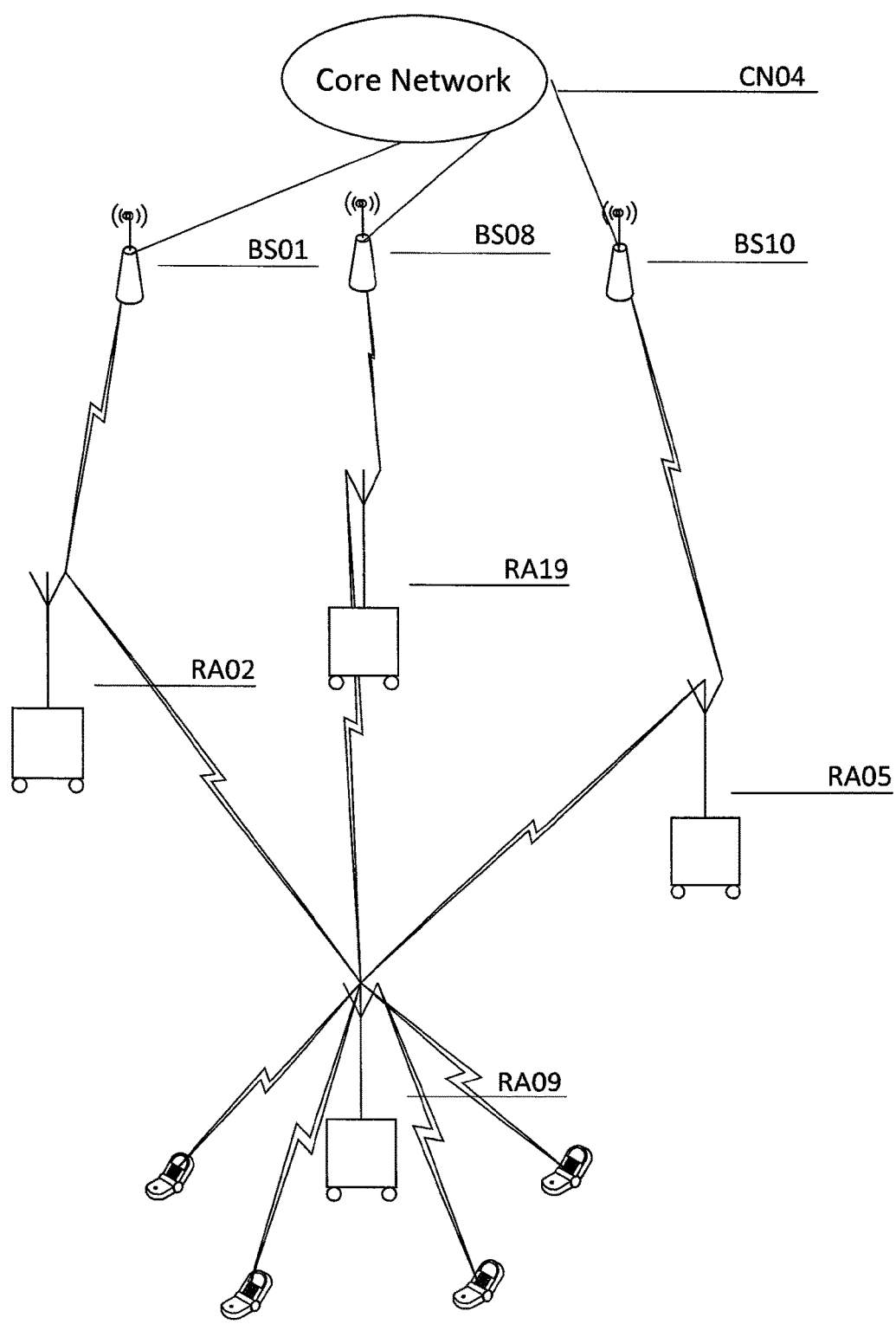
FIG. 11 is a simplified semi-pictorial diagram of an application in which data is delayed in a hierarchical cellular system and there are many alternative routes available.

Suitable duplication schemes include but are not limited to:

1. Sending the same messages several times in each available BS (base station)
2. Using a suitable error correcting code mechanism such as Hadamard code The applicability of the schemes for enlarging overall reliability includes but is not limited to services that employ a conventional sending mechanism characterized in that retrying is too slow for them, and applications in which data is delayed in a hierarchical cellular system and there are many alternative routes available, e.g. as shown in FIG. 11.

The terms in the table of FIGS. 14-15 may be construed either in accordance with any definition thereof appearing in the prior art literature or in accordance with the specification, or as stipulated in the table.

Schemes for enlarging overall network capacity by initializing handovers between possible serving cells are now described.

Figure 16:
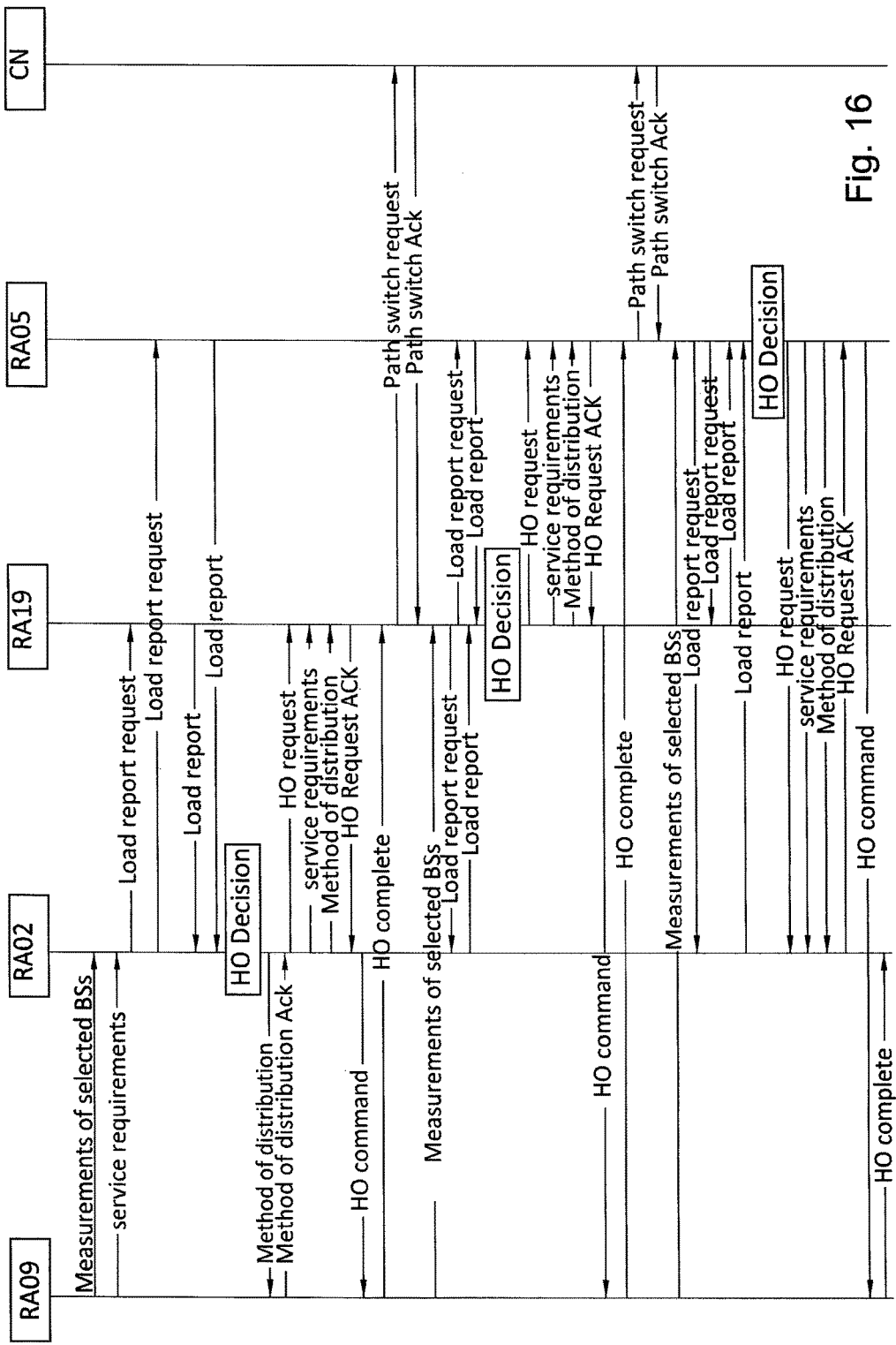
FIGS. 16-17 are sequence diagrams.

FIG. 13 is a semi-pictorial diagram of a system using handovers in order to enlarge the backhauling bandwidth of the hierarchical cellular system. FIG. 16 is a sequence diagram of an example method of enlarging overall network capacity for hierarchical network works. The method of FIG. 16 is similar to the enlarging method for regular LTE cellular system shown in FIG. 9, however, the tunneling of the messages occurs between different RAs through different relays. For example, the load request of RA02 may be tunneled through the core to get to RA19, as opposed to a typical cellular LTE where every BS (base station) can directly connect to every neighboring BS (base station). Tunneling the control messages through several RAs may add delays that can be reduced by sending at least one of the handover request, service requirements and the method of distribution earlier than the arrival time of the next data burst. Furthermore it is possible to use the handover mechanism to enlarge network capacity on a SM (mobile communication device) between different RAs, such as for example an SM06 handover between RA02 and RA19 and back.

Figure 17:
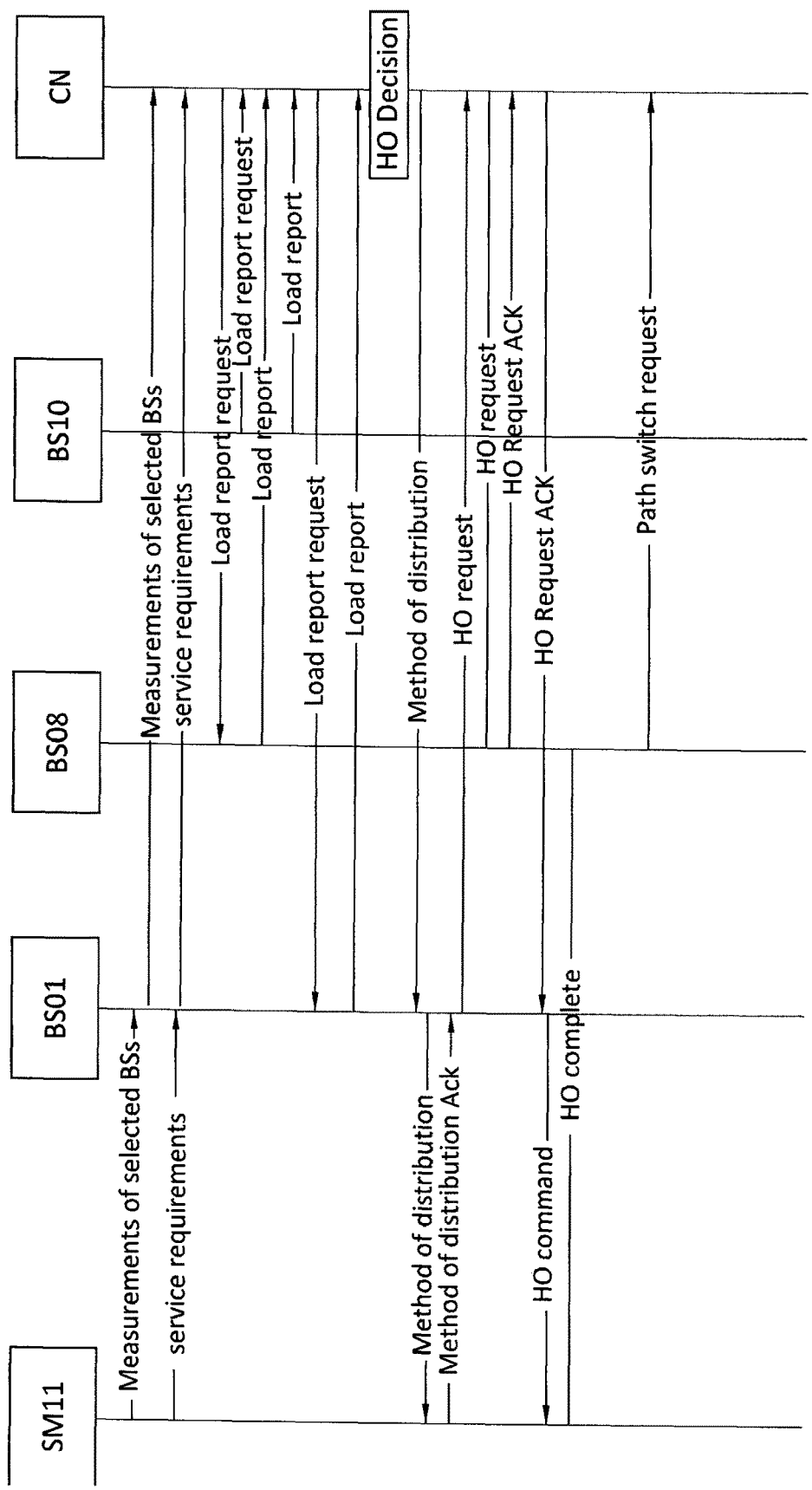

FIG. 17 is a sequence diagram of an example handover mechanism which may resides in the CN (Core network). A server e.g. a "know all" server, may reside in the core network and may be responsible for some or all of: scheduling, timing and ordering of handover procedures. However, using the handover mechanism in the core may add a delay; the messages may be sent through a handover broker and the handover broker might become a bottleneck.

Typically, the BS (base station) retrieves SM (mobile communication device)'s selected BSs; it demands the load report of the selected BSs from the BSs and retrieves service requirements from the SM (mobile communication device). In general there may be various requirements such as one or more of:

Guaranteed UL bit rate
Guaranteed DL bit rate
Maximal UL bit rate
Maximal DL bit rate The enlarging method allocates the UL\DL bit rate if possible; otherwise it rejects the request. In case of a maximal UL\DL bit rate requirement, it allocates an UL\DL bit rate up to the maximal requirement or up to what is available.

If a current BS (base station) or any of the other selected BSs are able to provide all the required bandwidth than the SM (mobile communication device) hands over to that BS (base station). Otherwise the BS (base station) sums the available bandwidth of several BSs; if they are able to provide the minimal application-specific requirements, BS (base station) executes the chosen distributed mechanism e.g. as shown in FIG. 12. BS (base station) typically sends to the SM (mobile communication device) the method of distribution; when the first data burst arrives BS (base station) initiates the handover mechanism, it sends a request for handover to the next selected BS (base station) including the method of distribution and the service requirements.

The method of distribution typically includes the size of each burst, the order of the BSs and all the load reports that lead to the method of distribution decision. In case of a change in one of the variables, the distributed mechanism commands that the method of distribution be changed according to the new inputs.

The Distributed mechanism and method illustrated in FIG. 12 handles guaranteed bit rate requirements different than maximal bit rate requirements. If the requirement is a guaranteed bit rate requirement, the scheme of FIG. 12 tries to allocate the selected BSs using a greedy approach sorting the BSs according to the available resources. If the requirement is a maximal bit rate, it allocates the selected BSs evenly, trying keeping the number of handover minimal; if there are not enough resources it allocates the maximum resources of which it is capable.

The SM (mobile communication device) receives a channel where the bit rate indicates the bit rate of the summary of the selected BSs' available bandwidth. When a BS (base station) receives information equal to its allocated burst size, it sends a handover request to the next BS (base station) and a handover command to the SM (mobile communication device).

It is appreciated that the schemes shown above are useful in enabling redundant information provided thereby to be used to enhance communication quality parameters such as but not limited to accuracy and packet loss. FIGS. 18A-21 illustrate examples of such enhancement, based on schemes above, which are merely illustrative and are not intended to be limiting.

Figure 18A:
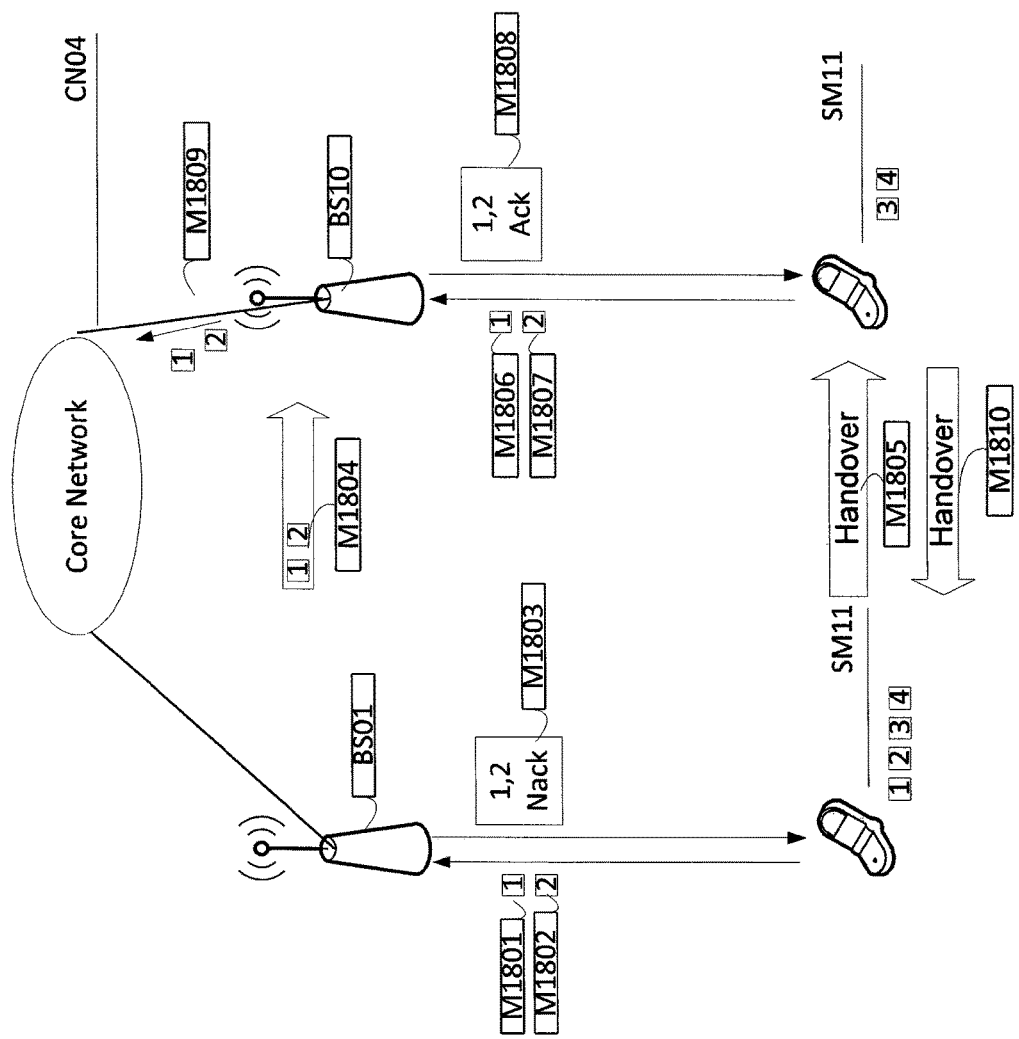
FIG. 18A is an example of load cell spreading using periodic handover and standard Hybrid Automatic Repeat Request (HARQ) in order to send UL data with additional redundant information

FIG. 18A is an example of load cell spreading using periodic handover and/or standard Hybrid Automatic Repeat Request (HARQ) in order to send UL data, typically with additional redundant information using efficient coding e.g. as shown. In the illustrated embodiment, on the first transmission of packet number 1 [M18101], the packet may be transmitted with sufficient information for the receiver to decode the original information bits of the packet of the CRC e.g. using a small amount of redundancy. Under good channel conditions this method is typically highly efficient. Normally i.e. when channel conditions are less than optimal, the packet may be sent using additional redundant information and less efficient modulation. The efficiency of channel usage per cell may be increased by using a typically periodic handover scheme where the packet is retransmitted to another cell. Using the additional retransmission enables decoding the original message correctly using an efficient coding. In the example depicted in FIG. 18A, SM11 sends packet #1[M1801] and packet #2[M1802] to BS01, BS01 sends nack message [M1803] and handovers [M1805] to BS10. BS01 sends the received packets [M1804] over an X2 interface to BS10 which receives retransmitted packet#1 [M1806] and packet #2[M1807]. BS10 decodes packet #1 using [M1801] and [M1806] and packet #2 using [M1802] and [M1807]. Then BS10 sends ack to packets #1 and #2 and handovers [M1810] SM11 back to BS01.

Figure 18B:
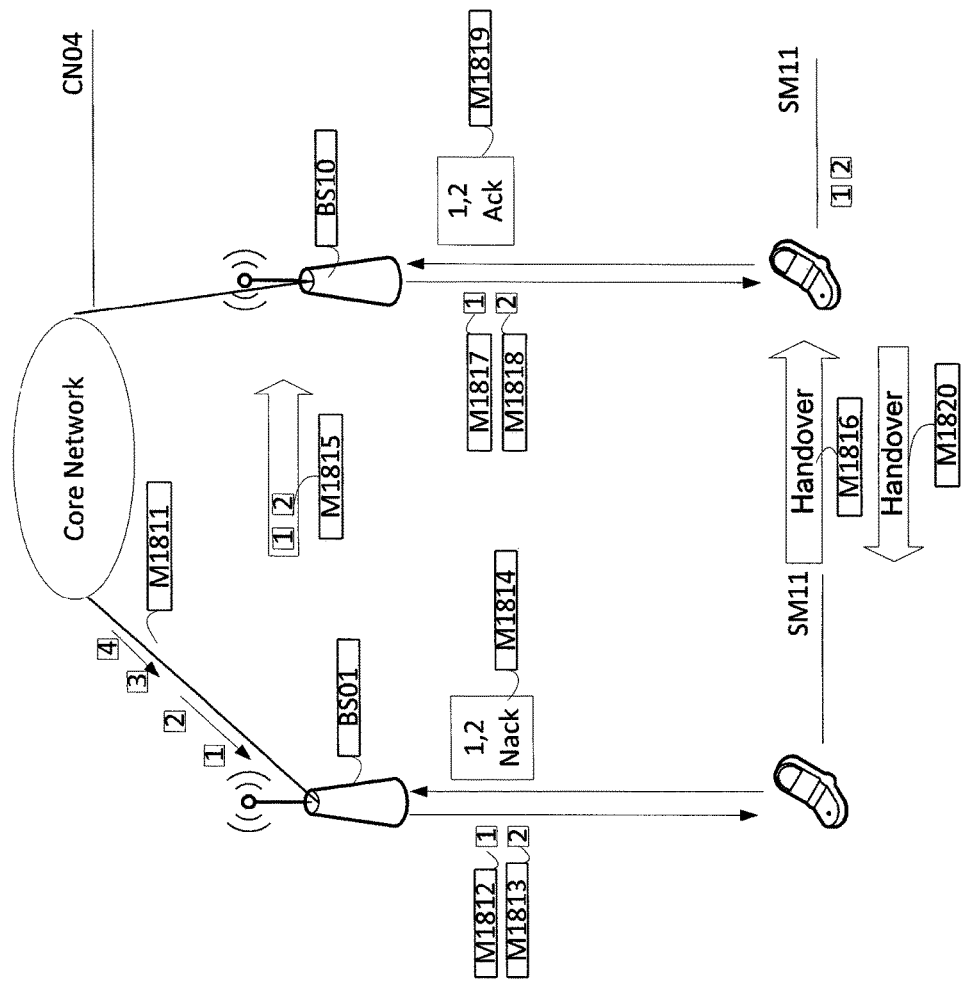
FIG. 18B is an example of load cell spreading using periodic handover and standard Hybrid Automatic Repeat Request (HARQ) in order to send DL data with additional redundant information

FIG. 18B is an example of load cell spreading using periodic handover and/or a standard Hybrid Automatic Repeat Request (HARQ) in order to send DL data with additional redundant information using efficient coding. On the first transmission [M1812] of a packet, the packet is transmitted with sufficient information for the receiver to decode the original information bits of the packet of the CRC using small amount of redundancy. In the event that an ack message is received, the base station[BS01] sends the next packet. Otherwise, a nack message[M1814] is received, the base station[BS01] handovers [M1816] the handset [SM11] to another neighboring base station[BS10] which receives the packet[M1815] over X2 and retransmits it to the handset[M1817]. The handset which now has enough information to decode the data, sends an ack message [M1819]. When the serving base station receives the ack message it handovers [M1820] back the handset to the original base station.

Figure 19:
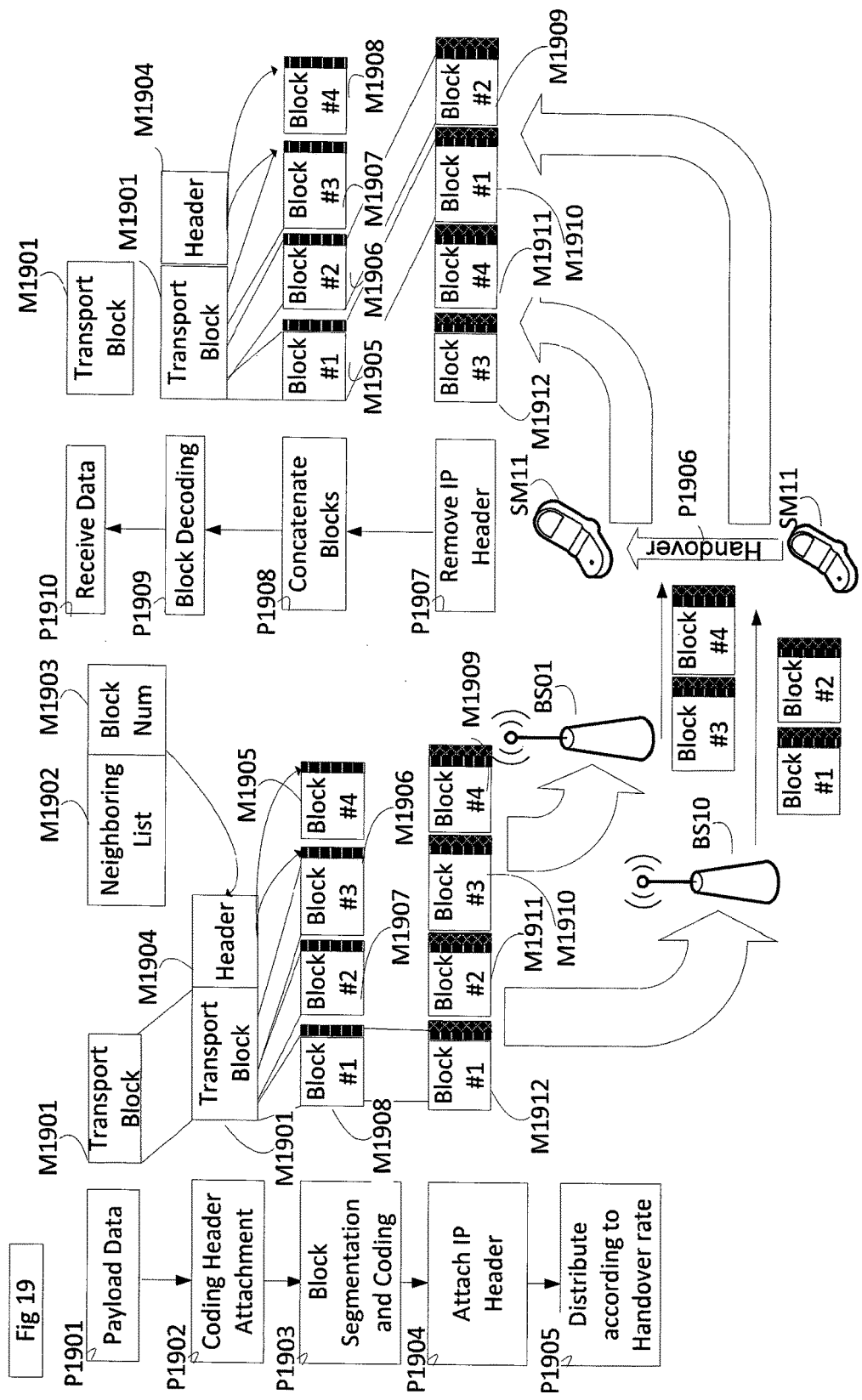
FIG. 19 is an example of transport channel processing of DL spread over base stations using a code correction method operative in accordance with certain embodiments of the present invention.

FIG. 19 is an example of transport channel processing of DL spread over base stations using an example code correction method. The payload data [M1901] may be coded and interleaved e.g. using a standard code correction convolution method. Next, the coded payload may be segmented to a predefined block size [M1908, M1907, M1906, M1905]. The blocks are forwarded to serving base stations BS10, BS01, which in turn send the waiting segmented block [M1912, M1911, M1910, M1909]. When each base station has finished sending the waiting segmented block it handovers [P1906] the handset[SM11] to the next neighboring serving base station in the block header [M1902]. When the handset [SM11] receives all the segmented blocks the handset decodes the original transport block and sends original transport block to a higher transport layer.

FIG. 20 is an example of transport channel processing of DL spread over base stations using an example code correction method. The payload data [M2001] is replicated as a function of the number of serving base station using a repetition method. Next, the replicated payload[M2005, M2006, M2007, M2008] is forwarded to neighboring serving base stations (BS10 and BS01 in the illustrated example). The neighboring serving base stations in turn send the waiting block [in the illustrated embodiment—M2012, M2011, M2010, M2009]. When each base station finishes sending the waiting segmented block that base station handovers [P2006] the handset[SM11] to the next neighboring serving base station in the block header [M2002]. When the handset [SM11] receives all the replicated blocks the handset decodes the original transport block using a majority voting method and sends the original transport block to a higher transport layer FIG. 21 is an example of transport channel processing of UL spread over base stations using an example code correction method. The payload data [M2101] may be coded and interleaved e.g. using a standard code correction convolution method. Next, the coded payload is segmented to a predefined block size, [M2108, M2107, M2106, M2105]. The blocks are forwarded to the serving base stations e.g. according to sliced coding parameters [M2102] which determine how many blocks are to be sent to each base station. When the handset receives a handover event [M2113] the handset uploads the next batch of blocks [M2110, M2109]. When the designated address in the core network receives [P2108] all the segmented blocks the core network decodes the original transport block and sends the original transport block to a higher transport layer.

The present invention is intended to include a base station effecting any portion of any of the functionalities shown and described herein.

The present invention is also intended to include a handset effecting any portion of any of the functionalities shown and described herein.

It is appreciated that various embodiments of the invention e.g. as shown and described herein are useful in conjunction with a mobile communication network system operative in conjunction with a core network including a core device and at least one static base station, the system comprising a plurality of base stations; and a population of mobile stations communicating via antennae with the base stations; the base stations including at least one moving base station which communicates via antennae with the mobile stations and includes base station functionality, a first radio manager and mobile station functionality all co-located with the base station functionality, the base station functionality having a physical back-connection to the first radio manager, the first radio manager having a physical connection with the mobile station functionality, the mobile station functionality communicating via antennae with at least one selectable static base station, wherein the first radio manager comprises a radio resource manager; and functionality for receiving information from, and sending information to, other radio managers, respectively co-located with other moving base stations, and for using the information to determine whether to reject at least one mobile station seeking to be served by an individual base station associated with the individual co-located radio manager.

It is appreciated that various embodiments of the invention e.g. as shown and described herein are suitable for multi-hop applications in which at least one relay is served by another relay rather than being served directly by a base station.

It is appreciated that various embodiments of the invention e.g. as shown and described herein are suitable for application to a wide variety of mobile communication technologies. For example:

3GPP Long Term Evolution (LTE), is a standard in mobile network technology which provides the following features:

Peak download rates of 326.4 Mbit/s for 4×4 antennae, and 172.8 Mbit/s for 2×2 antennae (utilizing 20 MHz of spectrum). [8]

Peak upload rates of 86.4 Mbit/s for every 20 MHz of spectrum using a single antenna. [8]

Five different terminal classes have been defined from a voice centric class up to a high end terminal that supports the peak data rates. All terminals will be able to process 20 MHz bandwidth.

At least 200 active users in every 5 MHz cell. (Specifically, 200 active data clients)

Sub-5 ms latency for small IP packets

Increased spectrum flexibility, with supported spectrum slices as small as 1.4 MHz and as large as 20 MHz (W-CDMA requires 5 MHz slices, leading to some problems with roll-outs of the technology in countries where 5 MHz is a commonly allocated amount of spectrum, and is frequently already in use with legacy standards such as 2G GSM and cdmaOne.) Limiting sizes to 5 MHz also limited the amount of bandwidth per handset.

In the 900 MHz frequency band to be used in rural areas, supporting an optimal cell size of 5 km, 30 km sizes with reasonable performance, and up to 100 km cell sizes supported with acceptable performance. In city and urban areas, higher frequency bands (such as 2.6

GHz in EU) are used to support high speed mobile broadband. In this case, cell sizes may be 1 km or even less.

Support for mobility. High performance mobile data is possible at speeds of up to 350 km/h, or even up to 500 km/h, depending on the frequency band used.[9]

Co-existence with legacy standards (users can transparently start a call or transfer data in an area using an LTE standard, and, should coverage be unavailable, continue the operation without any action on their part using GSM/GPRS or W-CDMA-based UMTS or even 3GPP2 networks such as cdmaOne or CDMA2000)

Support for MBSFN (Multicast Broadcast Single Frequency Network). This feature can deliver services such as Mobile TV using the LTE infrastructure, and is a competitor for DVB-H-based TV broadcast.

The features of E-UTRAN, the air interface of LTE, are:

Peak download rates up to 292 Mbit/s and upload rates up to 71 Mbit/s depending on the user equipment category.

Low data transfer latencies (sub-5 ms latency for small IP packets in optimal conditions), lower latencies for handover and connection setup time than with previous radio access technologies.

Support for terminals moving at up to 350 km/h or 500 km/h depending on the frequency band.

Support for both FDD and TDD duplexes as well as half-duplex FDD with the same radio access technology Support for all frequency bands currently used by IMT systems by ITU-R.

Flexible bandwidth: 1.4 MHz, 3 MHz, 5 MHz 15 MHz and 20 MHz are standardized.

Support for cell sizes from tens of meters radius (femto and picocells) up to 100 km radius macrocells.

Simplified architecture: The network side of EUTRAN is composed only of the enodeBs.

Support for inter-operation with other systems (e.g. GSM/EDGE, UMTS, CDMA2000, WiMAX)

Packet switched radio interface.

It is appreciated that various embodiments of the invention e.g. as shown and described herein are suitable for application to LTE and/or EUTRAN technology as well as to technologies possessing some but not all of the above features.

LTE Advanced is a 4th generation standard (4G)[2] of radio technologies designed to increase the capacity and speed of mobile telephone networks. Its features may include some or all of:

Relay Nodes

UE Dual TX antenna solutions for SU-MIMO and diversity MIMO

Scalable system bandwidth exceeding 20 MHz, potentially up to 100 MHz

Local area optimization of air interface

Nomadic/Local Area network and mobility solutions

Flexible Spectrum Usage

Cognitive radio

Automatic and autonomous network configuration and operation

Enhanced precoding and forward error correction

Interference management and suppression

Asymmetric bandwidth assignment for FDD

Hybrid OFDMA and SC-FDMA in uplink

UL/DL inter eNB coordinated MIMO

It is appreciated that various embodiments of the invention e.g. as shown and described herein are suitable for application to LTE-Advanced technology as well as to technologies possessing some but not all of the above features.

WiMAX (Worldwide Interoperability for Microwave Access) is a telecommunications protocol that provides fixed and fully mobile Internet access. Features include:

Adding support for mobility (soft and hard handover between base stations). This is seen as one of the most important aspects of 802.16e-2005, and is the very basis of Mobile WiMAX.

Scaling of the Fast Fourier transform (FFT) to the channel bandwidth in order to keep the carrier spacing constant across different channel bandwidths (typically 1.25 MHz, 5 MHz, 10 MHz or 20 MHz). Constant carrier spacing results in a higher spectrum efficiency in wide channels, and a cost reduction in narrow channels. Also known as Scalable OFDMA (SOFDMA). Other bands not multiples of 1.25 MHz are defined in the standard, but because the allowed FFT subcarrier numbers are only 128, 512, 1024 and 2048, other frequency bands will not have exactly the same carrier spacing, which might not be optimal for implementations.

Advanced antenna diversity schemes, and hybrid automatic repeat-request (HARQ)

Adaptive Antenna Systems (AAS) and MIMO technology

Denser sub-channelization, thereby improving indoor penetration

Introducing Turbo Coding and Low-Density Parity Check (LDPC)

Introducing downlink sub-channelization, allowing administrators to trade coverage for capacity or vice versa Adding an extra QoS class for VoIP applications.

It is appreciated that various embodiments of the invention e.g. as shown and described herein are suitable for application to WiMax technology as well as to technologies possessing some but not all of the above features.

The methods and systems shown and described herein as being applicable e.g. to certain protocols are also applicable to protocols which are not identical to the mobile communication protocols specifically mentioned herein but have relevant features in common therewith.

Flowchart illustrations appearing herein are intended to describe steps of an example method where, alternatively, a method may be substituted which includes only some of the steps illustrated and/or a method in which the steps are differently ordered.

It is appreciated that terminology such as "mandatory", "required", "need" and "must" refer to implementation choices made within the context of a particular implementation or application described herewithin for clarity and are not intended to be limiting since in an alternative implantation, the same elements might be defined as not mandatory and not required or might even be eliminated altogether.

It is appreciated that software components of the present invention including programs and data may, if desired, be implemented in ROM (read only memory) form including CD-ROMs, EPROMs and EEPROMs, or may be stored in any other suitable computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally includes at least one of a decision, an action, a product, a service or any other information described herein that impacts, in a positive manner, a problem or objectives described herein; and (b) outputting the solution.

Features of the present invention which are described in the context of separate embodiments may also be provided in combination in a single embodiment. Conversely, features of the invention, including method steps, which are described for brevity in the context of a single embodiment or in a certain order may be provided separately or in any suitable subcombination or in a different order. "e.g." is used herein in the sense of a specific example which is not intended to be limiting. Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, PDA, Blackberry GPRS, Satellite including GPS, or other mobile delivery. It is appreciated that in the description and drawings shown and described herein, functionalities described or illustrated as systems and sub-units thereof can also be provided as methods and steps therewithin, and functionalities described or illustrated as methods and steps therewithin can also be provided as systems and sub-units thereof. The scale used to illustrate various elements in the drawings is merely exemplary and/or appropriate for clarity of presentation and is not intended to be limiting.

The invention claimed is:

1. A computerized LTE (Long-Term Evolution) mobile communication system serving a population of LTE mobile communicators using a communication network comprising a plurality of mobile communication network LTE nodes which includes at least one LTE base station serving the population of LTE mobile communicators, the system comprising:

a processor configured for at least once commanding that processor-identified information be sent from at least one individual LTE mobile communicator from among said population of LTE mobile communicators to at least first and second LTE serving nodes from among said plurality of mobile communication network LTE nodes, wherein said information is mutually redundant over said at least first and second LTE serving nodes;

wherein handover functionality is used to enable the individual LTE mobile communicator to be physically handed over from one to another of said LTE serving nodes, for enhancing quality of information flowing over at least one of downlink and uplink channels;

wherein said handover functionality comprises handover functionality provided by 3GPP Long Term Evolution (LTE) protocol.

2. The system according to claim 1 wherein data is sent to said first LTE serving node and redundancy information derived from said data is sent to said second LTE serving node.

3. The system according to claim 1 wherein identical data is sent to said first and second LTE serving nodes.

4. The system according to claim 3 wherein first data is sent to said first LTE serving node and only a subset of said first data is sent to said second LTE serving node.

5. The system according to claim 4 wherein said first data comprises a sequence of packets sent to said first LTE serving node and said subset comprises a subsequence within said sequence which is sent to said second LTE serving node.

6. The system according to claim 1 wherein said quality of information is enhanced in that probability of packet delay is reduced.

7. The system according to claim 1 wherein said quality of information is enhanced in that probability of packet loss is reduced.

8. The system according to claim 1 wherein said quality of information is enhanced in that accuracy of packets received is increased.

9. The system according to claim 1 wherein said quality of information is enhanced in that probability that packets will be rejected is decreased.

10. The system according to claim 1 wherein at least a portion of control functionality employed to enhance quality of information by controlling said mutually redundant information is located in a base station serving said individual communicator.

11. The system according to claim 1 wherein at least a portion of control functionality employed to enhance quality of information by controlling said mutually redundant information is located centrally in a core serving a base station serving said individual communicator.

12. The system according to claim 1 wherein at least a portion of control functionality employed to enhance quality of information by controlling said mutually redundant information is located in a relay served by at least one base station and serving said LTE individual communicator.

13. The system according to claim 1 wherein said individual mobile communicator is operative to at least pseudo-randomly select at least one LTE serving node from a set of candidate serving nodes defined within the plurality of mobile communication network LTE nodes.

14. The system according to claim 1 wherein said individual mobile communicator is operative to select, at intervals, at least one LTE serving node from a set of candidate serving nodes defined within said plurality of mobile communication network LTE nodes, on a round-robin basis.

15. The system according to claim 1 wherein said individual mobile communicator is operative to use a load-dependent scheme to select at least one LTE serving node from a set of candidate serving nodes defined within said plurality of mobile communication network LTE nodes.

16. The computerized mobile communication system according to claim 1,
wherein, in at least one instance in which, due to backhauling addition of another user results in an overloaded backhauling line and low utilization of radio channels,
handover is effected on a round robin basis, such that periodically, an individual mobile communicator transfers to a next on line in a list of serving nodes proximal enough to receive from the individual LTE mobile communicator thereby to enlarge overall network capacity, thereby to prevent increase in service delay and service queues of users connected to an individual base station.

17. The system according to claim 1
wherein said at least one LTE base station includes a plurality of LTE base stations comprising at least first and second LTE base stations and wherein the first LTE base station operates as a serving base station and is operative to perform a handover of a connection of a specific mobile communicator from the first LTE base station to the second LTE base station including selecting said second LTE base station so as to improve statistical distribution of mobile communicators over available serving base stations from among the plurality of LTE base stations,
thereby to enable the specific mobile communicator in the population of LTE mobile communicators to at least once associate itself with the serving base station using a processor-based serving base station selection functionality operative for selecting said serving base station;
wherein, in at least one instance in which, due to backhauling, addition of another user results in an overloaded backhaul line and low utilization of radio channels, a current serving base station performs a handover of the connection of the mobile communicator from the current serving base station to a next LTE base station which becomes the next current serving base station and is the next on line in a list of LTE base stations proximal enough to receive from the mobile communicator, thereby to enlarge at least one of capacity and reliability.

18. The system according to claim 17 wherein the individual LTE mobile communicator is operative to at least pseudo-randomly select the serving node from a set of candidate serving nodes defined within the plurality of nodes wherein the set of candidate serving nodes includes all nodes sufficiently close to the individual mobile communicator to adequately receive transmissions therefrom.

19. The system according to claim 17 which employs a fair balancing scheme, designed to ensure that total throughput of descendants served by various relays is as balanced as possible over available relays.

20. The system according to claim 19 wherein flitting between relays occurs in a weighted manner such that the mobile communicator spends more time with the relay that relays throughput faster.

21. The system according to claim 17 wherein said second LTE base station is selected to improve distribution of the population of mobile communicators over the plurality of LTE base stations,
and to increase use of available bandwidth to and from at least one LTE base station which provides the mobile communicator with an acceptable signal to noise ratio,
wherein, in at least one instance in which, due to backhauling, addition of another user results in an overloaded backhaul line and low utilization of radio channels, periodically, after a predetermined time interval, the current serving base station performs a handover of the connection of the mobile communicator from the current serving base station to a next LTE base station which becomes the next current serving base station and is the next on line in a list of LTE base stations proximal enough to receive from the mobile communicator, to enlarge overall network capacity and to prevent increase in service delay and service queues of users connected to an individual base station.

22. The system according to claim 1 which employs cell hopping, comprising at least one initiated, synchronized, scheduled handover of at least one mobile station in the network, is utilized to better exploit at least one backhauling resource of the network.

23. A system according to claim 1 wherein at least one individual mobile communicator from among said population of LTE mobile communicators is controlled for at least once sending processor-identified mutually redundant information over a set of at least first and second LTE serving nodes from among said plurality of mobile communication network LTE nodes according to a handover rate.

24. A system according to claim 1 wherein bandwidth capacity is increased using backhauling radio links.

25. A computerized LTE (Long-Term Evolution) mobile communication method serving a population of LTE mobile communicators using a communication network comprising a plurality of mobile communication LTE network nodes which includes a population of LTE base stations including at least one LTE base station serving the population of LTE mobile communicators, the method comprising:
providing functionality operative for at least once commanding that processor-identified information be sent from at least one individual LTE mobile communicator from among said population of LTE mobile communicators to at least first and second LTE serving nodes from among said plurality of mobile communication network LTE nodes wherein said information is mutually redundant over said at least first and second LTE serving nodes; and
using handover functionality to enable the individual LTE mobile communicator to be physically handed over from one to another of said LTE serving nodes, while enhancing quality of information flowing over at least one of downlink and uplink channels;

wherein said handover functionality comprises handover functionality provided by 3GPP Long Term Evolution (LTE) protocol.

26. A method according to claim 25 and also comprising providing a load-balancing scheme operative to associate a mobile communicator with a serving node, including use of constant periodic time slot sharing to enhance statistical distribution of mobile communicators between available serving nodes.

27. A method according to claim 25 and also comprising providing a load-balancing scheme operative to associate a mobile communicator with a serving node, including use of random distribution over time to enhance statistical distribution of mobile communicators between available serving nodes.

28. A method according to claim 25 and also comprising providing a load-balancing scheme operative to associate a mobile communicator with a serving node, including use of random distribution over destination to enhance statistical distribution of mobile communicators between available serving nodes.

29. A method according to claim 25 and also comprising providing a load-balancing scheme operative to associate a mobile communicator with a serving node, including use of proportional sharing according to the load and link quality to enhance statistical distribution of mobile communicators between available serving nodes.

30. A computer program product, comprising a non-transitory tangible computer readable medium having computer readable program code embodied therein, said computer readable program code adapted to be executed to implement a computerized LTE (Long-Term Evolution) mobile communication method serving a population of LTE mobile communicators using a communication network comprising a plurality of mobile communication LTE network nodes which includes a population of LTE base stations including at least one LTE base station serving the population of LTE mobile communicators, the method comprising:

providing functionality operative for at least once commanding that processor-identified information be sent from at least one individual LTE mobile communicator from among said population of LTE mobile communicators to at least first and second LTE serving nodes from among said plurality of mobile communication network LTE nodes wherein said information is mutually redundant over said at least first and second LTE serving nodes; and using handover functionality to enable the individual LTE mobile communicator to be physically handed over from one to another of said LTE serving nodes, while enhancing quality of information flowing over at least one of downlink and uplink channels;

wherein said handover functionality comprises handover functionality provided by 3GPP Long Term Evolution (LTE) protocol.

\* \* \* \* \*